(12) United States Patent
Sawaguchi

(10) Patent No.: US 10,708,447 B2
(45) Date of Patent: Jul. 7, 2020

(54) IMAGE FORMING APPARATUS SHARING CONNECTION INFORMATION WITH A TERMINAL DEVICE

(71) Applicant: Oki Data Corporation, Tokyo (JP)

(72) Inventor: Kenji Sawaguchi, Tokyo (JP)

(73) Assignee: Oki Data Corporation, Tokyo (JP)

( * ) Notice: Subject to any disclaimer, the term of this patent is extended or adjusted under 35 U.S.C. 154(b) by 0 days.

(21) Appl. No.: 16/159,801

(22) Filed: Oct. 15, 2018

(65) Prior Publication Data

US 2019/0116274 A1    Apr. 18, 2019

(30) Foreign Application Priority Data

Oct. 17, 2017  (JP) ................................ 2017-200844

(51) Int. Cl.
*G06F 3/12*       (2006.01)
*H04N 1/00*      (2006.01)

(52) U.S. Cl.
CPC ..... *H04N 1/00217* (2013.01); *H04N 1/00307* (2013.01); *H04N 1/00315* (2013.01)

(58) Field of Classification Search
CPC .................................................... G06F 3/1292
See application file for complete search history.

(56) References Cited

U.S. PATENT DOCUMENTS

| | | | | |
|---|---|---|---|---|
| 2006/0288405 | A1* | 12/2006 | Albisu | .................... G06F 21/34 726/8 |
| 2014/0355061 | A1* | 12/2014 | Asai | .................. H04N 1/00307 358/1.15 |
| 2015/0116746 | A1* | 4/2015 | Park | ...................... G06F 3/1263 358/1.13 |

FOREIGN PATENT DOCUMENTS

JP        2008-046977 A       2/2008

* cited by examiner

*Primary Examiner* — Eric A. Rust
(74) *Attorney, Agent, or Firm* — Rabin & Berdo, P.C.

(57) ABSTRACT

An image forming system includes a first mobile terminal and an image forming apparatus. The first mobile terminal transmits first image data by carrying out first wireless communication. The image forming apparatus receives the first image data by carrying out the first wireless communication and forms an image on the basis of the first image data. The first mobile terminal includes first storage, a first communicator, and a first setting section. The image forming apparatus includes second storage, a second communicator, a second setting section, and an image forming section. The first and second storages both hold first communication setting information and are respectively able to hold second and third communication setting information. The first and second setting sections, when the first and second communicators, respectively, carry out first wireless communication, configure communication setting of the first and second communicators, respectively, on the basis of the first communication setting information.

6 Claims, 17 Drawing Sheets

|  | COMMUNICATION SETTING INFORMATION INF9 | COMMUNICATION SETTING INFORMATION INF20 |
|---|---|---|
| SSID | TOKYO_OFFICE | PrintFromSmartPhone |
| ENCRYPTION KEY | 11112222AAAAbbbb | 9999999999 |

FIG. 5

|  | COMMUNICATION SETTING INFORMATION INF9 |
|---|---|
| SSID | TOKYO_OFFICE |
| ENCRYPTION KEY | 11112222AAAAbbbb |

FIG. 6

|  | COMMUNICATION SETTING INFORMATION INF20 |
|---|---|
| SSID | PrintFromSmartPhone |
| ENCRYPTION KEY | 9999999999 |

FIG. 7

| | COMMUNICATION SETTING INFORMATION INF10 | COMMUNICATION SETTING INFORMATION INF20 |
|---|---|---|
| SSID | OSAKA_OFFICE | PrintFromSmartPhone |
| ENCRYPTION KEY | 33334444CCCCdddd | 9999999999 |

| | COMMUNICATION SETTING INFORMATION INF10 |
|---|---|
| SSID | OSAKA_OFFICE |
| ENCRYPTION KEY | 33334444CCCCdddd |

| | COMMUNICATION SETTING INFORMATION INF20 |
|---|---|
| SSID | PrintFromSmartPhone |
| ENCRYPTION KEY | 9999999999 |

| HEADER INFORMATION | XXXX |
|---|---|
| TRANSMITTER IP ADDRESS | 192.168.110.100 |
| RECEIVER IP ADDRESS | 192.168.110.101 |
| DATA | PCPrint,Completed, From PrintApplication@192.168.110.101 |

IMAGE FORMING APPARATUS SHARING CONNECTION INFORMATION WITH A TERMINAL DEVICE

CROSS REFERENCE TO RELATED APPLICATIONS

The present application claims priority from Japanese Patent Application No. 2017-200844 filed on Oct. 17, 2017, the entire contents of which are hereby incorporated by reference.

BACKGROUND

The technology relates to an image forming system that forms an image and to an image forming apparatus to be used in such an image forming system.

There exists an image forming apparatus that receives print data by carrying out wireless communication with various electronic devices and forms an image on a recording medium on the basis of the received print data. In wireless communication, for example, communication setting is configured on the basis of communication setting information for establishing the wireless communication, and the communication is carried out thereafter. For example, Japanese Unexamined Patent Application Publication No. 2008-46977 discloses an image forming apparatus that rewrites communication setting information on the basis of communication setting information for establishing wireless communication and rewrite enabled/disabled information indicating whether rewriting the stated communication setting information is permitted or prohibited.

SUMMARY

Typically, it is desired that electronic devices be highly user-friendly, and there is also expectation for improved user-friendliness in an image forming system that includes an image forming apparatus and an electronic device that are able to communicate with each other wirelessly.

It is desirable to provide an image forming system and an image forming apparatus that are able to provide increased user-friendliness.

According to one embodiment of the technology, there is provided an image forming system that includes a first mobile terminal and an image forming apparatus. The first mobile terminal transmits first image data by carrying out first wireless communication. The image forming apparatus receives the first image data by carrying out the first wireless communication and forms an image on the basis of the first image data. The first mobile terminal includes first storage, a first communicator, and a first setting section. The first storage holds first communication setting information and is able to hold second communication setting information. The first communicator carries out the first wireless communication. The first setting section, when the first communicator carries out the first wireless communication, selects the first communication setting information held in the first storage and configures communication setting of the first communicator on the basis of the first communication setting information. The image forming apparatus includes second storage, a second communicator, a second setting section, and an image forming section. The second storage holds the first communication setting information and is able to hold third communication setting information. The second communicator carries out the first wireless communication. The second setting section, when the second communicator carries out the first wireless communication, selects the first communication setting information held in the second storage and configures communication setting of the second communicator on the basis of the first communication setting information. The image forming section forms an image on the basis of the first image data received by the second communicator.

According to one embodiment of the technology, there is provided an image forming system that includes a first mobile terminal and an image forming apparatus. The first mobile terminal transmits first image data by carrying out first wireless communication. The image forming apparatus receives the first image data by carrying out the first wireless communication and forms an image on the basis of the first image data. The first mobile terminal includes an acquiring section, first storage, a first communicator, and a first setting section. The acquiring section acquires first communication setting information from the image forming apparatus. The first storage is able to hold second communication setting information. The first communicator carries out the first wireless communication. The first setting section, when the first communicator carries out the first wireless communication, selects the first communication setting information acquired by the acquiring section and configures communication setting of the first communicator on a basis of the first communication setting information. The image forming apparatus includes second storage, a supplying section, a second communicator, a second setting section, and an image forming section. The second storage holds the first communication setting information and is able to hold third communication setting information. The supplying section supplies the first communication setting information held in the second storage to the first mobile terminal. The second communicator carries out the first wireless communication. The second setting section, when the second communicator carries out the first wireless communication, selects the first communication setting information held in the second storage and configures communication setting of the second communicator on the basis of the first communication setting information. The image forming section forms an image on the basis of the first image data received by the second communicator.

According to one embodiment of the technology, there is provided an image forming apparatus that includes second storage, a second communicator, a second setting section, and an image forming section. The second storage holds first communication setting information and is able to hold communication setting information different from the first communication setting information. The second communicator receives first image data by carrying out first wireless communication. The second setting section, when the second communicator carries out the first wireless communication, selects the first communication setting information held in the second storage and configures communication setting of the second communicator on the basis of the first communication setting information. The image forming section forms an image on the basis of the first image data received by the second communicator.

BRIEF DESCRIPTION OF DRAWINGS

FIG. 5 is a diagram illustrating an example of communication setting information stored in the smartphone illustrated in FIG. 4.

FIG. 6 is another diagram illustrating an example of the communication setting information held in the smartphone illustrated in FIG. 4.

FIG. 7 is still another diagram illustrating an example of the communication setting information held in the smartphone illustrated in FIG. 4.

DETAILED DESCRIPTION

Figure 1A:
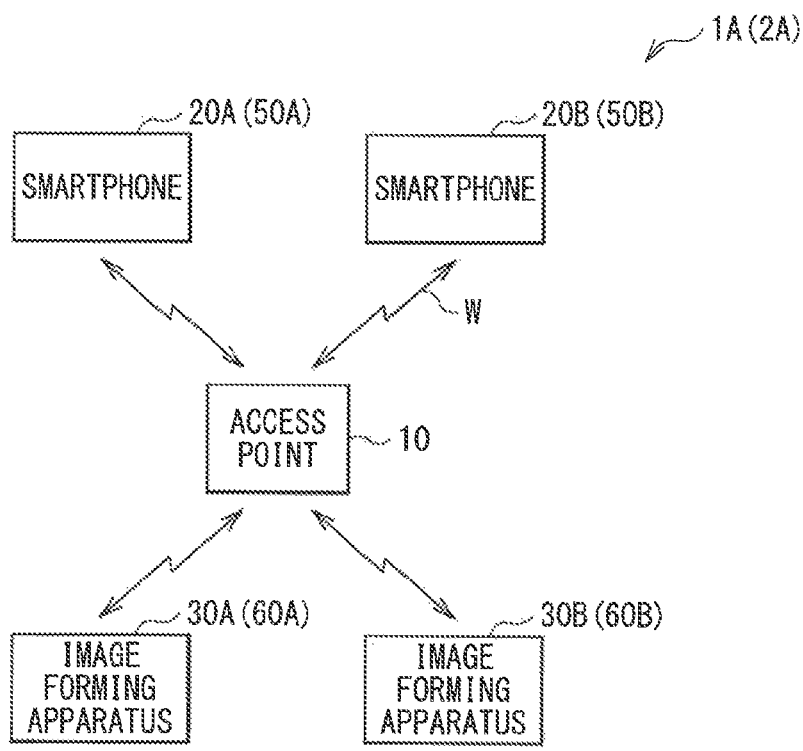
FIG. 1A is a block diagram illustrating a configuration example of an image forming system according to an embodiment.

Hereinafter, some example embodiments of the technology will be described in detail with reference to the drawings. Note that the following description is directed to illustrative examples of the technology and not to be construed as limiting to the technology. Factors including, without limitation, numerical values, shapes, materials, components, positions of the components, and how the components are coupled to each other are illustrative only and not to be construed as limiting to the technology. Further, elements in the following example embodiments which are not recited in a most-generic independent claim of the technology are optional and may be provided on an as-needed basis. The drawings are schematic and are not intended to be drawn to scale. Note that the like elements are denoted with the same reference numerals, and any redundant description thereof will not be described in detail. The description will be given in the following order.

1. First Example Embodiment
2. Second Example Embodiment

1. First Example Embodiment

Configuration Example

Figure 1B:
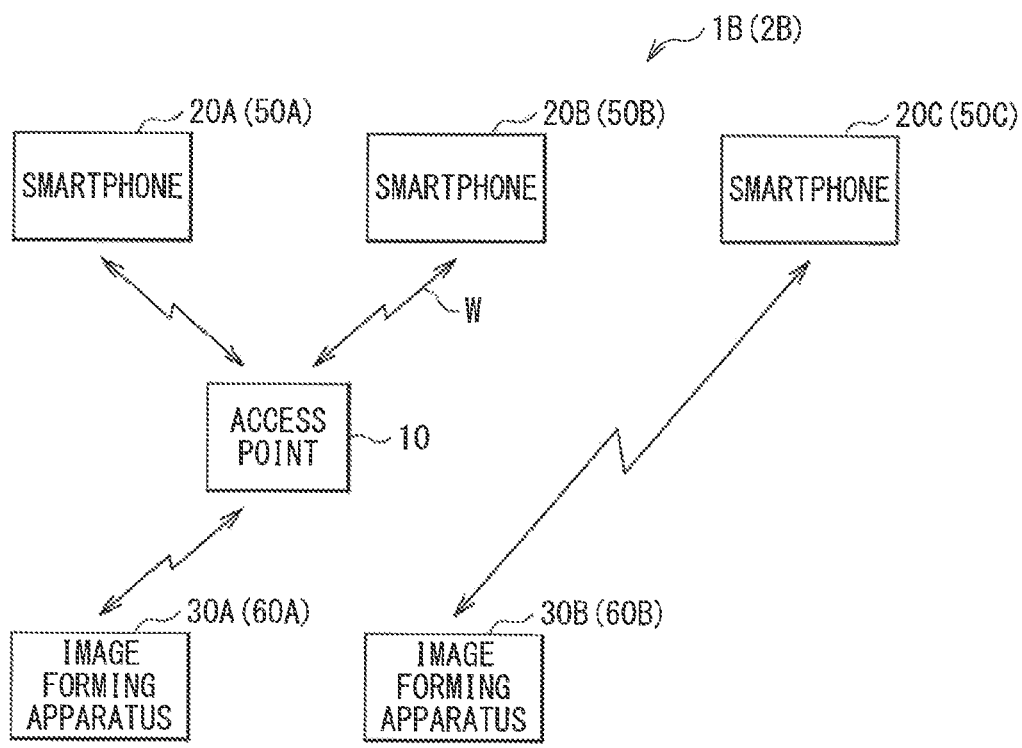
FIG. 1B is a block diagram illustrating another configuration example of the image forming system according to an embodiment.

FIGS. 1A and 1B each illustrate a configuration example of an image forming system, i.e., an image forming system 1, according to an example embodiment of the technology. FIG. 1A illustrates an example of the image forming system 1 in one state, i.e., an image forming system 1A. FIG. 1B illustrates an example of the image forming system 1 in another state, i.e., an image forming system 1B. The image forming system 1 may form an image on a recording medium on the basis of image data supplied through wireless communication.

As illustrated in FIGS. 1A and 1B, the image forming system 1 may include: an access point 10; three smartphones 20, i.e., smartphones 20A, 20B, and 20C; and two image forming apparatuses 30, i.e., image forming apparatuses 30A and 30B. The access point 10 and the image forming apparatuses 30A and 30B may be installed in a certain office in this example, and this office may be an Osaka office in this example.

The access point 10 may be a base station for a wireless local area network (LAN). The access point 10 may configure a basic service set (BSS) with the use of wireless LAN terminals, referred to as stations STA as well hereinafter, such as the smartphones 20 or the image forming apparatuses 30, that communicate with the access point 10. The access point 10 may relay communication between the stations STA by carrying out wireless communication W between the access point 10 and the stations STA.

The smartphones 20 may each be a multifunctional mobile phone. The smartphones 20 may each have a function of carrying out the wireless communication W with the use of a wireless LAN. In this example, the smartphones 20A and 20B, illustrated in FIGS. 1A and 1B, may be owned by users working at the Osaka office, and the smartphone 20C, illustrated in FIG. 1B, may be owned by a user working at a Tokyo office. In this example, the smartphones 20 may each transmit print data DP to any of the image forming apparatuses 30 on the basis of a user operation by carrying out the wireless communication W with the relevant image forming apparatus 30.

The image forming apparatuses 30 may each form an image on a recording medium on the basis of the print data DP transmitted from any of the smartphones 20. The image forming apparatuses 30 may each have a function of carrying out the wireless communication W with the use of a wireless LAN and receive the print data DP transmitted from any of the smartphones 20 with the use of this wireless LAN. The image forming apparatuses 30 may each have two operation modes M, namely, an infrastructure mode M1 and an access point mode M2. In the infrastructure mode M1, as illustrated in FIG. 1A, the image forming apparatus 30 may carry out the wireless communication W with any of the smartphones 20 via the access point 10 with the use of a wireless LAN. In the access point mode M2, as illustrated in FIG. 1B, the image forming apparatus 30, e.g., the image forming apparatus 30B in this example, may carry out the wireless communication W with the smartphone 20, e.g., the smartphone 20C in this example, directly with the use of a wireless LAN without involving the access point 10. In one example, in the access point mode M2, the image forming apparatus 30 itself may operate as an access point and thus carry out the wireless communication W with any of the smartphones 20.

With this configuration, as illustrated in FIG. 1A, the smartphones 20A and 20B and the image forming apparatuses 30A and 30B may carry out the wireless communication W via the access point 10 in the image forming system 1A. In other words, the image forming apparatuses 30A and 30B may each operate in the infrastructure mode M1 in this example.

As illustrated in FIG. 1B, in the image forming system 1B, similarly to the image forming system 1A, the smartphones 20A and 20B and the image forming apparatus 30A may carry out the wireless communication W via the access point 10. Further, the smartphone 20C and the image forming apparatus 30B may carry out the wireless communication W directly without involving the access point 10. In other words, in this example, the image forming apparatus 30A may operate in the infrastructure mode M1, and the image forming apparatus 30B may operate in the access point mode M2.

[Access Point 10]

Figures 2, 3:
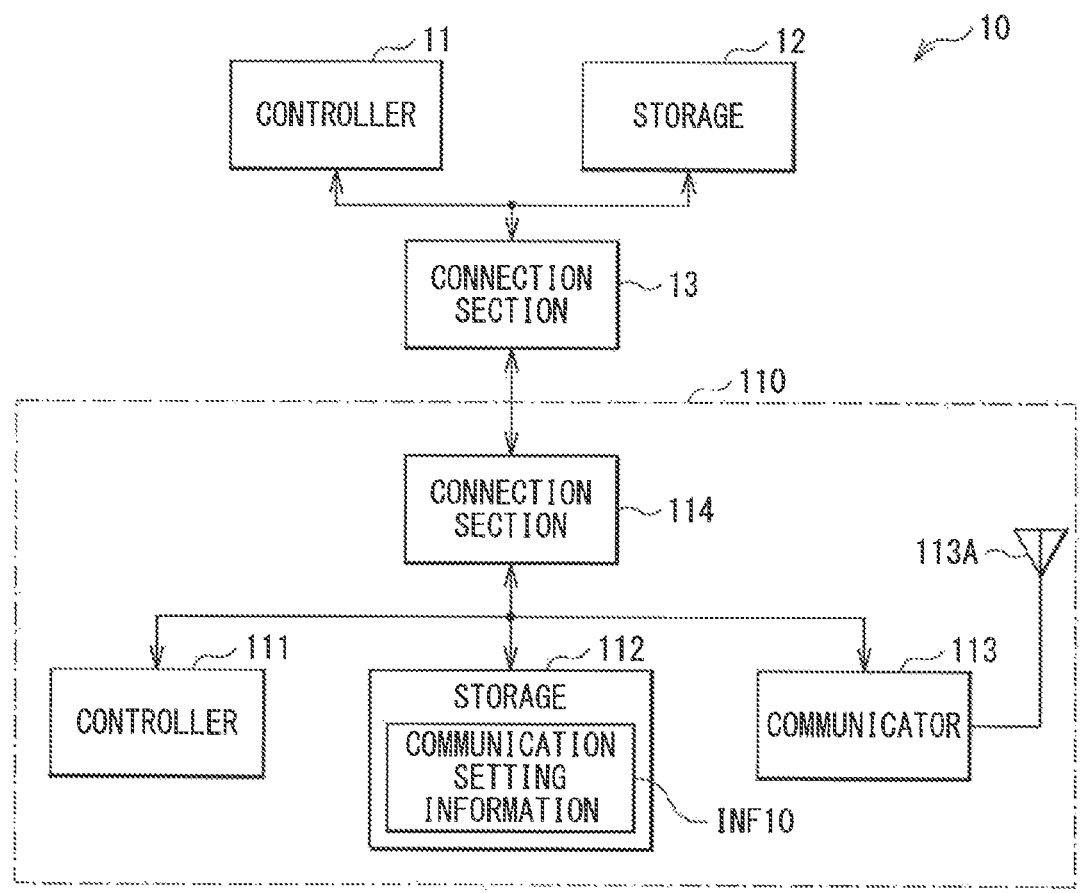
FIG. 2 is a block diagram illustrating a configuration example of an access point illustrated in FIGS. 1A and 1B.
FIG. 3 is a diagram illustrating an example of communication setting information held in the access point illustrated in FIG. 2.

FIG. 2 illustrates a configuration example of the access point 10. The access point 10 may include a controller 11, storage 12, a connection section 13, and a data communication module 110.

The controller 11 may control the operation of the access point 10. The controller 11 may include, for example, a module that includes a central processing unit (CPU) and a random-access memory (RAM). The storage 12 may hold, for example, a program to be executed in the access point 10, communication data, and various pieces of setting data. The storage 12 may include, for example, a non-volatile memory. The connection section 13 may be an interface for the data communication module 110. The controller 11, the storage 12, and the connection section 13 may configure a so-called "host" in the access point 10.

The data communication module 110 may carry out the wireless communication W with the use of a wireless LAN. The data communication module 110 may include a controller 111, storage 112, a communicator 113, and a connection section 114.

The controller 111 may control the operation of the data communication module 110. The controller 111 may include, for example, a CPU and a RAM.

The storage 112 may hold, for example, a program to be executed in the data communication module 110, communication data, and various pieces of setting data. The storage 112 may include, for example, a non-volatile memory. The storage 112 may hold communication setting information INF10. The communication setting information INF10 may be information pertaining to communication setting directed to establishing of the wireless communication W between the access point 10 and the station STA. The communication setting information INF10 may include information on a service set identifier (SSID) and an encryption key. The SSID may be an identifier of a base station for the wireless LAN, and the encryption key may be a keyword directed to encrypting of the content of communication in the wireless communication W.

FIG. 3 illustrates an example of the communication setting information INF10 held in the storage 112 of the access point 10. In this example, the SSID may be set to "OSAKA_OFFICE," and the encryption key may be set to "33334444CCCCdddd."

The communicator 113 may include, for example, a modulation circuit that generates a ratio frequency (RF) signal by modulating communication data, a demodulation circuit that generates communication data by demodulating an RF signal, and an antenna 113A. With this configuration, the communicator 113 may generate an RF signal by modulating communication data and transmit the generated RF signal with the use of the antenna 113A. Further, the communicator 113 may generate communication data by demodulating an RF signal received via the antenna 113A.

The connection section 114 may be an interface for the host, i.e., the controller 11, the storage 12, and the connection section 13, of the access point 10.

[Smartphone 20]

A configuration example of the smartphones 20 will now be described with the smartphone 20C serving as an example.

Figure 4:
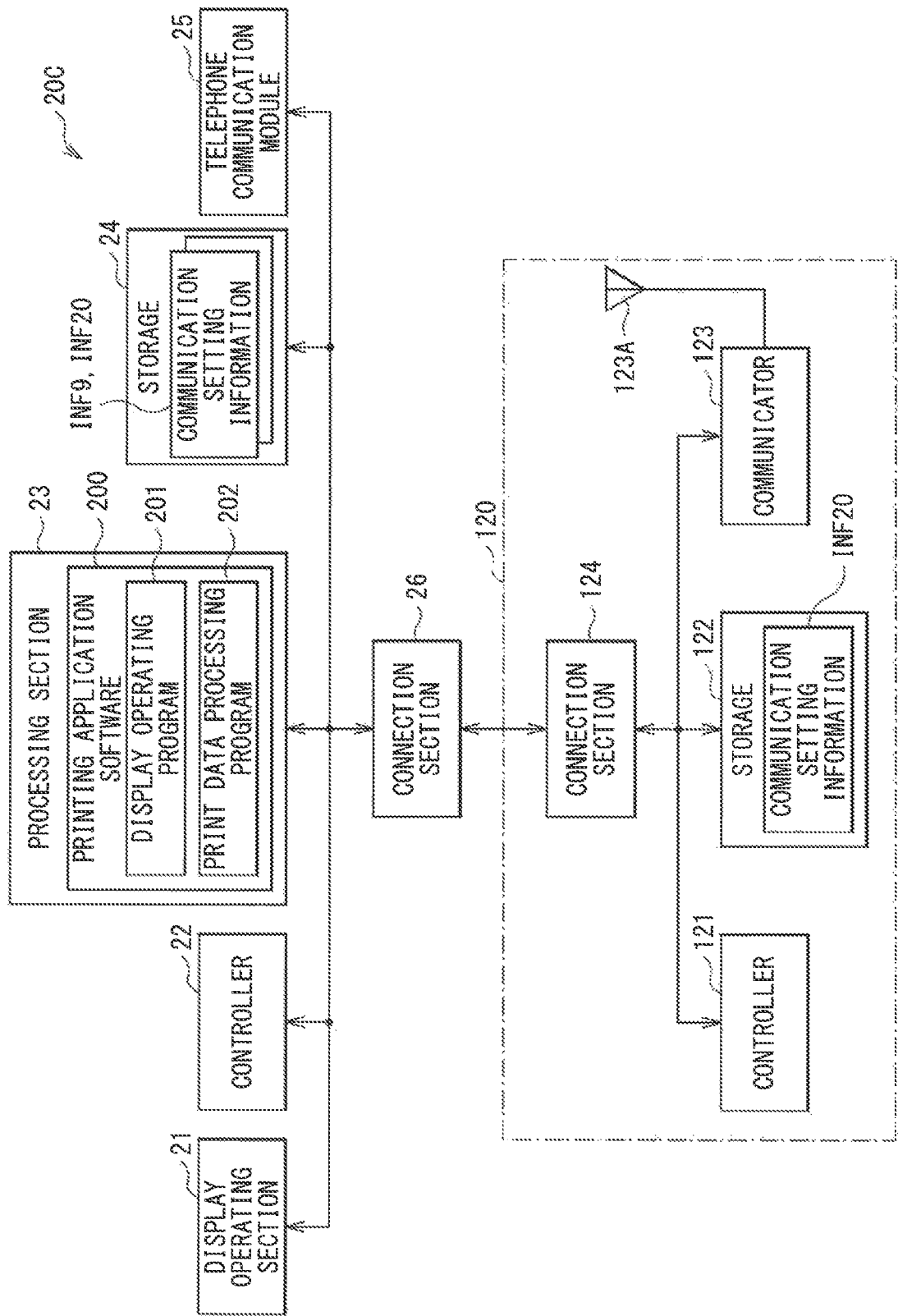
FIG. 4 is a block diagram illustrating a configuration example of a smartphone according to an embodiment.

FIG. 4 illustrates a configuration example of the smartphone 20C. The smartphone 20C may include a display operating section 21, a controller 22, a processing section 23, storage 24, a telephone communication module 25, a connection section 26, and a data communication module 120.

The display operating section 21 may receive a user operation and display information such as an operating state of the smartphone 20C and an instruction for the user. The display operating section 21 may include, for example, a liquid-crystal display, a touch panel, various indicators, or various buttons.

The controller 22 may control the operation of the smartphone 20C. The processing section 23 may carry out various processes by executing a program. The controller 22 and the processing section 23 may include, for example, a module that includes a CPU and a RAM. The smartphone 20C may have printing application software 200 installed therein, and the processing section 23 may execute this printing application software 200. The printing application software 200 may include a display operating program 201 and a print data processing program 202. The display operating program 201 may cause the display operating section 21 to display information and to receive a user operation. The print data processing program 202 may convert information to be printed to data, i.e., the print data DP, that is interpretable by the image forming apparatuses 30.

The storage 24 may hold, for example, a program to be executed in the smartphone 20C, communication data, and various pieces of setting data. The storage 24 may include, for example, a non-volatile memory. The storage 24 may hold the installed printing application software 200. Further, the storage 24 may hold two pieces of communication setting information INF9 and INF20. The communication setting information INF9 may pertain to communication setting directed to establishing of the wireless communication W between the smartphone 20C and an access point 9 installed in the Tokyo office. The communication setting information INF20 may pertain to communication setting directed to establishing of the wireless communication W between the smartphone 20C and the image forming apparatus 30 that operates in the access point mode M2, i.e., the image forming apparatus 30B in this example.

FIG. 5 illustrates an example of the communication setting information INF9 and INF20 held in the storage 24. In the communication setting information INF9, the SSID may be set to "TOKYO_OFFICE," and the encryption key may be set to "11112222AAAAbbbb" in this example. Further, in the communication setting information INF20, the SSID may be set to "PrintFromSmartPhone," and the encryption key may be set to "9999999999."

For example, the communication setting information INF9 may be input by the user when the smartphone 20C is wirelessly connected for the first time to the access point 9 installed in the Tokyo office and may be stored into the storage 24 of the smartphone 20C. Further, the communication setting information INF20 may be stored into the storage 24 of the smartphone 20C when the printing application software 200 is installed in the smartphone 20C. In other words, the printing application software 200 may include information on the communication setting information INF20. To rephrase, the communication setting information INF20 may not be modifiable and may be fixed. The printing application software 200 may be programmed to store such fixed communication setting information INF20 into the storage 24 when the printing application software 200 is installed in the smartphone 20C.

The telephone communication module 25 may carry out wireless communication with a base station for a mobile phone, for example, with the use of Long Term Evolution (LTE).

The connection section 26 may be an interface for the data communication module 120.

The data communication module 120 may carry out the wireless communication W with the use of a wireless LAN. The data communication module 120 may include a controller 121, storage 122, a communicator 123, and a connection section 124. In other words, the data communication module 120 may have a configuration similar to that of the data communication module 110 of the access point 10. The storage 122 may hold a single piece of communication setting information INF, i.e., the communication setting information INF20 in the example illustrated in FIG. 4. The communication setting information INF held in the storage 122 may be rewritable by the controller 22.

FIGS. 6 and 7 each illustrate an example of the communication setting information INF that may be allowed to be held in the storage 122. FIG. 6 illustrates an example of the communication setting information INF9, and FIG. 7 illustrates an example of the communication setting information INF20. In one example, the storage 122 may usually store information that is the same as the communication setting information INF9 held in the storage 24, as illustrated in FIG. 6. Thus, the smartphone 20C may be able to carry out the wireless communication W with the access point 9 in the Tokyo office. Further, in a case where the user of the smartphone 20C makes a business trip to the Osaka office and connects the smartphone 20C to the image forming apparatus 30B that operates in the access point mode M2, the controller 22 of the smartphone 20C may temporarily store the communication setting information INF20 held in the storage 24 into the storage 122, as illustrated in FIG. 7. Thus, the smartphone 20C may be able to carry out the wireless communication W with the image forming apparatus 30B that operates in the access point mode M2 in the Osaka office, as illustrated in FIG. 1B.

The description has been given thus far with the smartphone 20C serving as an example, and this description may also be applicable to the smartphones 20A and 20B in a similar manner. For example, in the smartphone 20A, the storage 122 of the data communication module 120 may hold communication setting information INF10. This communication setting information INF10 may be the same as the communication setting information INF10, illustrated in FIG. 3, held in the access point 10. For example, the communication setting information INF10 may be input by the user when the smartphone 20A is wirelessly connected for the first time to the access point 10, stored into the storage 24 of the smartphone 20A, and also stored into the storage 122 of the smartphone 20A. Thus, the smartphone 20A may be able to carry out the wireless communication W with the image forming apparatuses 30A and 30B via the access point 10, as illustrated in FIG. 1A, and may be able to carry out the wireless communication W with the image forming apparatus 30A via the access point 10, as illustrated in FIG. 1B.

[Image Forming Apparatus 30]

A configuration example of the image forming apparatuses 30 will now be described with the image forming apparatus 30B serving as an example.

Figure 8:
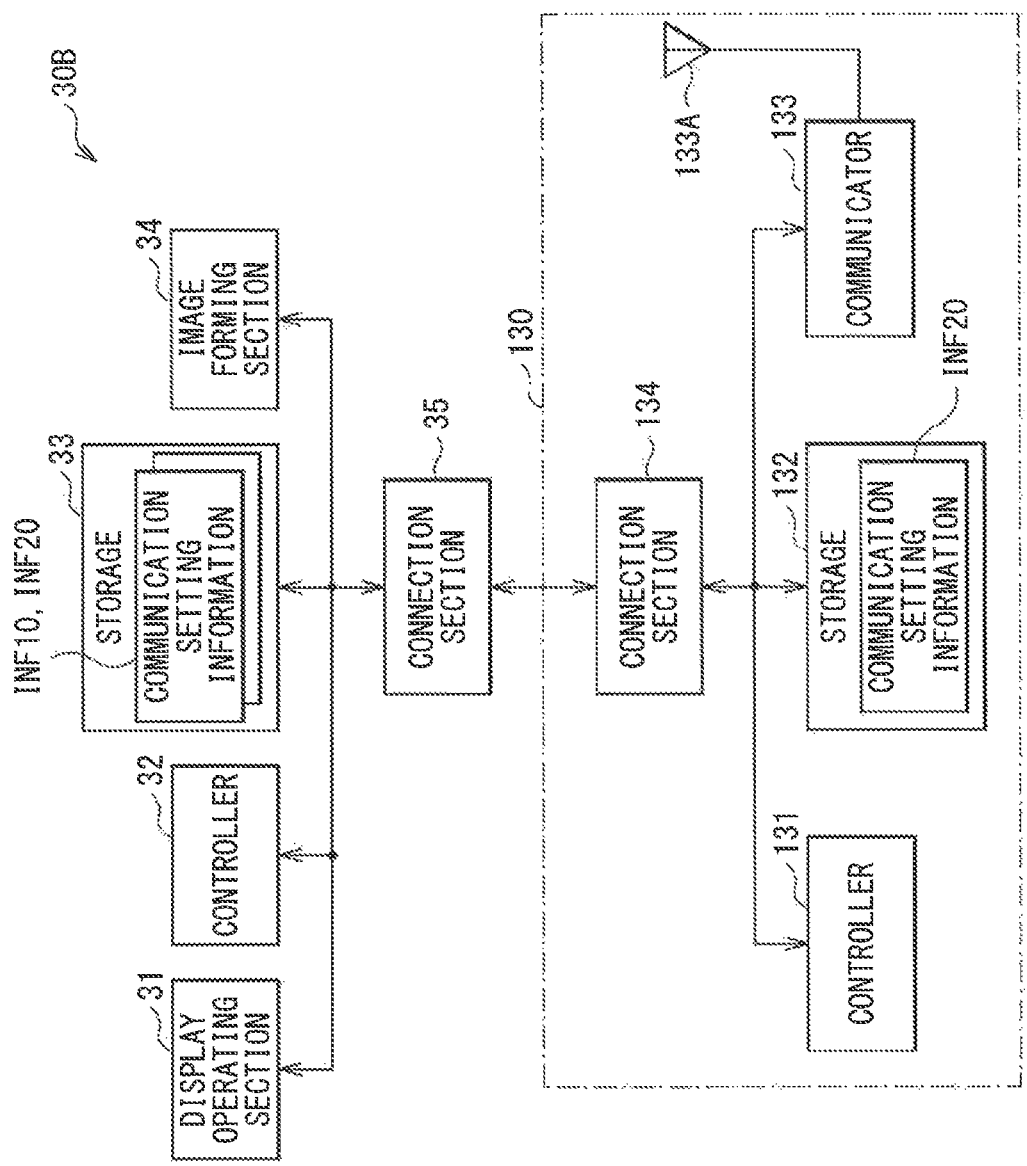
FIG. 8 is a block diagram illustrating a configuration example of an image forming apparatus according to an embodiment.

FIG. 8 illustrates a configuration example of the image forming apparatus 30B. The image forming apparatus 30B may include a display operating section 31, a controller 32, storage 33, an image forming section 34, a connection section 35, and a data communication module 130.

The display operating section 31 may receive a user operation and display information such as an operating state of the image forming apparatus 30B or an instruction for the user.

Figures 9, 10, 11, 12:
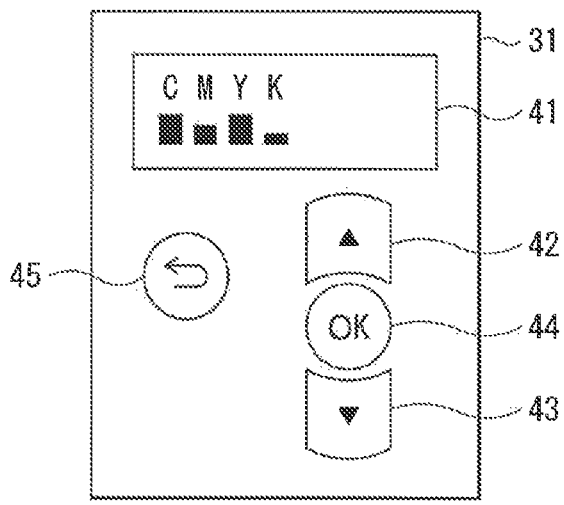
FIG. 9 is a diagram illustrating a configuration example of a display operating section illustrated in FIG. 8.
FIG. 10 is a diagram illustrating an example of communication setting information held in the image forming apparatus illustrated in FIG. 8.
FIG. 11 is another diagram illustrating an example of the communication setting information held in the image forming apparatus illustrated in FIG. 8.
FIG. 12 is still another diagram illustrating an example of the communication setting information held in the image forming apparatus illustrated in FIG. 8.

FIG. 9 illustrates a configuration example of the display operating section 31. The display operating section 31 may include a display section 41, an up button 42, a down button 43, an "OK" button 44, and a "back" button 45. The display section 41 may display information. The display section 41 may include, for example, a liquid-crystal display. In this example, the display section 41 may be displaying a so-called standby screen. This standby screen may indicate the remaining amount of each of four color developers, i.e., cyan (C), magenta (M), yellow (Y), and black (K) developers, in the image forming section 34. The up button 42 and the down button 43 may be operated by the user for selecting an item. The "OK" button 44 may be operated by the user for proceeding to the next screen. The "back" button 45 may be operated by the user for returning to the previous screen.

The controller 32 may control the operation of the image forming apparatus 30B. The controller 32 may include, for example, a module that includes a CPU and a RAM.

The storage 33 may hold, for example, a program to be executed in the image forming apparatus 30B, communication data, and various pieces of setting data. The storage 33 may include, for example, a non-volatile memory. The storage 33 may hold two pieces of communication setting information INF10 and INF20.

FIG. 10 illustrates an example of the communication setting information INF10 and INF20 held in the storage 33. The communication setting information INF10 may be the same as the communication setting information INF10, illustrated in FIG. 3, held in the access point 10. The communication setting information INF20 may be the same as the communication setting information INF20, illustrated in FIG. 5, held in the smartphone 20C.

For example, the communication setting information INF10 may be input by the user when the image forming apparatus 30B is wirelessly connected for the first time to the access point 10 and may be stored into the storage 33 of the image forming apparatus 30B. Further, the communication setting information INF20 may be stored into the storage 33 of the image forming apparatus 30B when firmware is installed in the image forming apparatus 30B, for example. In other words, the firmware may include information on the communication setting information INF20. To rephrase, the communication setting information INF20 may not be modifiable and may be fixed. The firmware may be programmed to store such fixed communication setting information INF20 into the storage 33 when the firmware is installed in the image forming apparatus 30B at the time of manufacturing the image forming apparatus 30B, for example. Thus, when the image forming apparatus 30B is shipped out, the communication setting information INF20 is already stored in the storage 33.

The image forming section 34 may form an image on a recording medium on the basis of the print data DP transmitted from the smartphone 20. In this example, the image forming section 34 may form an image on a recording medium with the use of four color developers, i.e., cyan (C), magenta (M), yellow (Y), and black (K) developers. This, however, is not a limiting example, and the image forming section 34 may instead form an image on a recording medium with the use of three color developers, e.g., cyan, magenta, and yellow developers, or form an image on a recording medium with the use of one color developer, e.g., a black developer.

The connection section 35 may be an interface for the data communication module 130.

The data communication module 130 may carry out the wireless communication W with the use of a wireless LAN. The data communication module 130 may include a controller 131, storage 132, a communicator 133, and a connection section 134. In other words, the data communication module 130 may have a configuration similar to that of the data communication module 110 of the access point 10. The storage 132 may hold a single piece of communication setting information INF, e.g., the communication setting information INF20 in the example illustrated in FIG. 8. The communication setting information INF held in the storage 132 may be rewritable by the controller 32.

FIGS. 11 and 12 each illustrate an example of the communication setting information INF that may be allowed to be held in the storage 132. FIG. 11 illustrates an example of the communication setting information INF10, and FIG. 12 illustrates an example of the communication setting information INF20. In one example, the storage 132 may usually hold information that is the same as the communication setting information INF10 held in the storage 33, as illustrated in FIG. 11. Thus, the image forming apparatus 30B may be able to carry out the wireless communication W with the access point 10, as illustrated in FIG. 1A. In a case where the user of the smartphone 20C makes a business trip to the Osaka office and connects the smartphone 20C to the image forming apparatus 30B that operates in the access point mode M2, the controller 32 of the image forming apparatus 30B may temporarily store the communication setting information INF20 held in the storage 33 into the storage 132, as illustrated in FIG. 12. Thus, the image forming apparatus 30B that operates in the access point mode M2 may be able to carry out the wireless communication W with the smartphone 20C in the Osaka office, as illustrated in FIG. 1B.

The description has been given thus far with the image forming apparatus 30B serving as an example, and this description may also be applicable to the image forming apparatus 30A in a similar manner. In the image forming apparatus 30A, the storage 132 of the data communication module 130 may hold the communication setting information INF10. The communication setting information INF10 may be the same as the communication setting information INF10, illustrated in FIG. 3, held in the access point 10. For example, the communication setting information INF10 may be input by the user when the image forming apparatus 30A is wirelessly connected for the first time to the access point 10 and may be stored into the storage 132 of the image forming apparatus 30A. Thus, the image forming apparatus 30A may be able to carry out the wireless communication W with the smartphones 20A and 20B via the access point 10, as illustrated in FIGS. 1A and 1B.

In this example, the smartphone 20C may correspond to a "first mobile terminal" in one specific but non-limiting embodiment of the technology. The image forming apparatus 30B may correspond to an "image forming apparatus" in one specific but non-limiting embodiment of the technology. The print data DP may correspond to "first image data" in one specific but non-limiting embodiment of the technology.

The storage 24 may correspond to "first storage" in one specific but non-limiting embodiment of the technology. The communication setting information INF20 may correspond to "first communication setting information" in one specific but non-limiting embodiment of the technology. The communication setting information INF9 may correspond to "second communication setting information" in one specific but non-limiting embodiment of the technology. The data communication module 120 may correspond to a "first communicator" in one specific but non-limiting embodiment of the technology. The controller 22 and the processing section 23 may correspond to a "first setting section" in one specific but non-limiting embodiment of the technology.

The storage 33 may correspond to "second storage" in one specific but non-limiting embodiment of the technology. The communication setting information INF10 may correspond to "third communication setting information" in one specific but non-limiting embodiment of the technology. The data communication module 130 may correspond to a "second communicator" in one specific but non-limiting embodiment of the technology. The controller 32 may correspond to a "second setting section" in one specific but non-limiting embodiment of the technology. The image forming section 34 may correspond to an "image forming section" in one specific but non-limiting embodiment of the technology. The controller 131 may correspond to an "identifier appending section" in one specific but non-limiting embodiment of the technology.

Example Operation and Example Workings

An example operation and example workings of the image forming system 1 according to the present example embodiment will now be described.

Overview of Overall Operation

First, an overview of an overall operation of the image forming system 1 will be described with reference to FIGS. 1A and 1B. In the image forming system 1A illustrated in FIG. 1A, the storage 112 of the access point 10 may hold the communication setting information INF10, and the storages 122 of the respective smartphones 20A and 20B may hold the communication setting information INF10. Further, the image forming apparatuses 30A and 30B may both operate in the infrastructure mode M1, and the storages 132 of the respective image forming apparatuses 30A and 30B may hold the communication setting information INF10. Thus, the smartphone 20A may, for example, carry out the wireless communication W with the image forming apparatus 30A via the access point 10 and transmit the print data DP to the image forming apparatus 30A. Thereafter, the image forming apparatus 30A may receive this print data DP and form an image on a recording medium on the basis of the received print data DP. This description may also be applicable to the image forming apparatus 30B in a similar manner.

In the image forming system 1B illustrated in FIG. 1B, the storage 112 of the access point 10 may hold the communication setting information INF10, and the storages 122 of the respective smartphones 20A and 20B may hold the communication setting information INF10. Further, the image forming apparatus 30A may operate in the infrastructure mode M1, and the storage 132 of the image forming apparatus 30A may hold the communication setting information INF10. Thus, the smartphone 20A may, for example, carry out the wireless communication W with the image forming apparatus 30A via the access point 10 and transmit the print data DP to the image forming apparatus 30A. Thereafter, the image forming apparatus 30A may receive this print data DP and form an image on a recording medium on the basis of the received print data DP.

Further, in the image forming system 1B, the storage 122 of the smartphone 20C may temporarily hold the communication setting information INF20. The image forming apparatus 30B may operate in the access point mode M2, and the storage 132 of the image forming apparatus 30B may temporarily hold the communication setting information INF20. Thus, the smartphone 20C may, for example, carry out the wireless communication W with the image forming apparatus 30B directly without involving the access point 10 and transmit the print data DP to the image forming apparatus 30B. Thereafter, the image forming apparatus 30B may receive this print data DP and form an image on a recording medium on the basis of the received print data DP.

[Detailed Operation]

In the Osaka office, the image forming apparatus 30B may usually operate in the infrastructure mode M1, and the storage 132 of the image forming apparatus 30B may hold the communication setting information INF10, illustrated in FIG. 11, directed to establishing of the wireless communication W with the access point 10. Thus, as illustrated in FIG. 1A, the smartphone 20A may, for example, carry out the wireless communication W with the image forming apparatus 30B via the access point 10 and transmit the print data DP to the image forming apparatus 30B. Thereafter, the image forming apparatus 30B may receive this print data DP and form an image on a recording medium on the basis of the received print data DP.

The user of the smartphone 20C may usually be in the Tokyo office, and the storage 122 of the smartphone 20C may hold the communication setting information INF9, illustrated in FIG. 6, directed to establishing of the wireless communication W with the access point 9 installed in the Tokyo office. Thus, the smartphone 20C may carry out the wireless communication W via the access point 9 in the Tokyo office.

In a case where the user of the smartphone 20C makes a business trip to the Osaka office and is to perform printing with the use of the image forming apparatus 30B, the user may cause the image forming apparatus 30B to operate in the access point mode M2 by operating the smartphone 20C and the image forming apparatus 30B, temporarily rewrite the communication setting information INF in the data communication module 120 of the smartphone 20C to the communication setting information INF20, illustrated in FIG. 7, and temporarily rewrite the communication setting information INF in the data communication module 130 of the image forming apparatus 30B to the communication setting information INF20, illustrated in FIG. 12. Thus, as illustrated in FIG. 1B, the smartphone 20C may carry out the wireless communication W with the image forming apparatus 30B directly without involving the access point 10 and transmit the print data DP to the image forming apparatus 30B, and the image forming apparatus 30B may be able to form an image on a recording medium on the basis of the print data DP. Hereinafter, this operation will be described in detail.

Figure 13A:
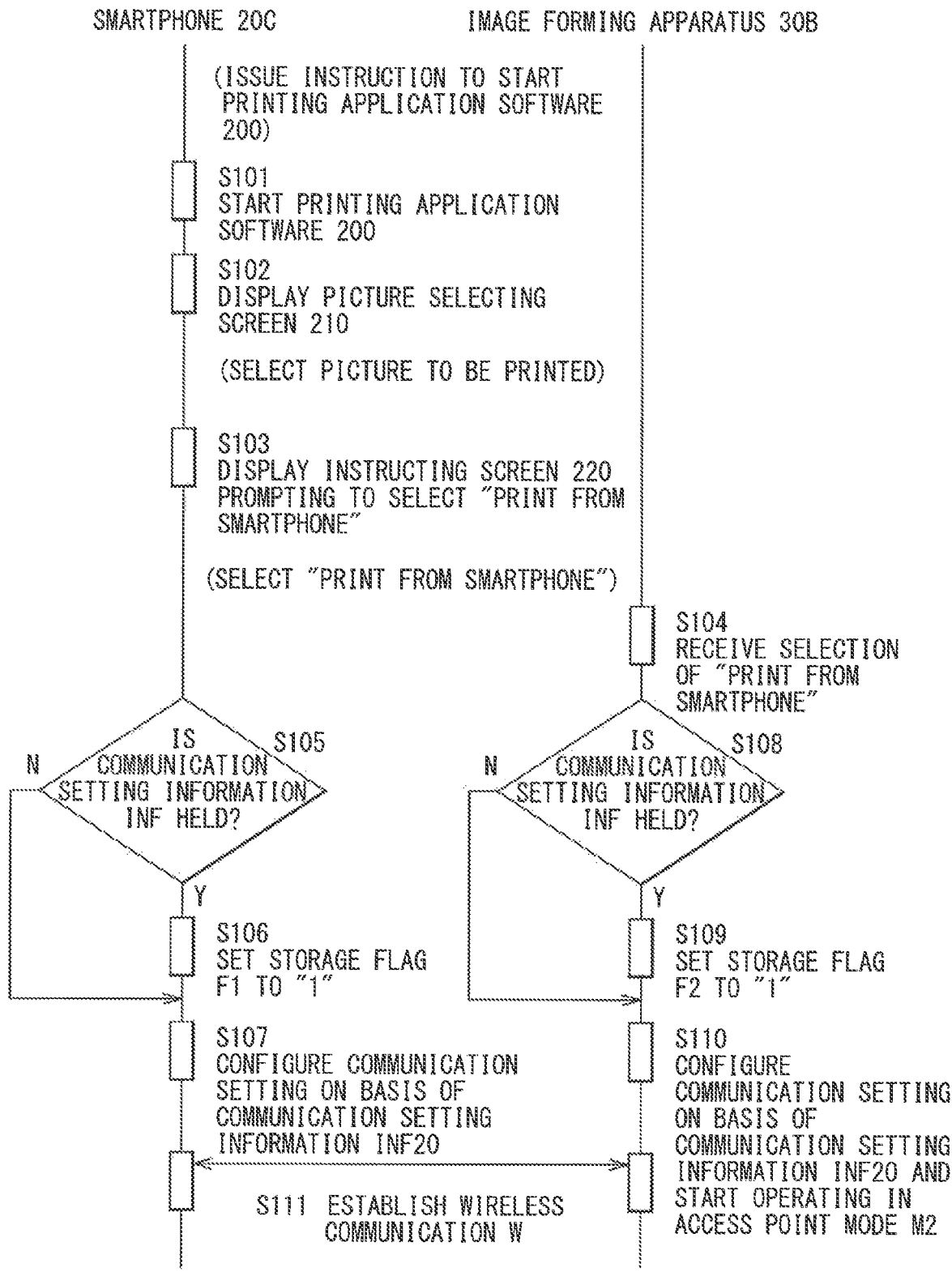
FIG. 13A is a sequence diagram illustrating an operation example of an image forming system according to an embodiment.
Figure 13B:
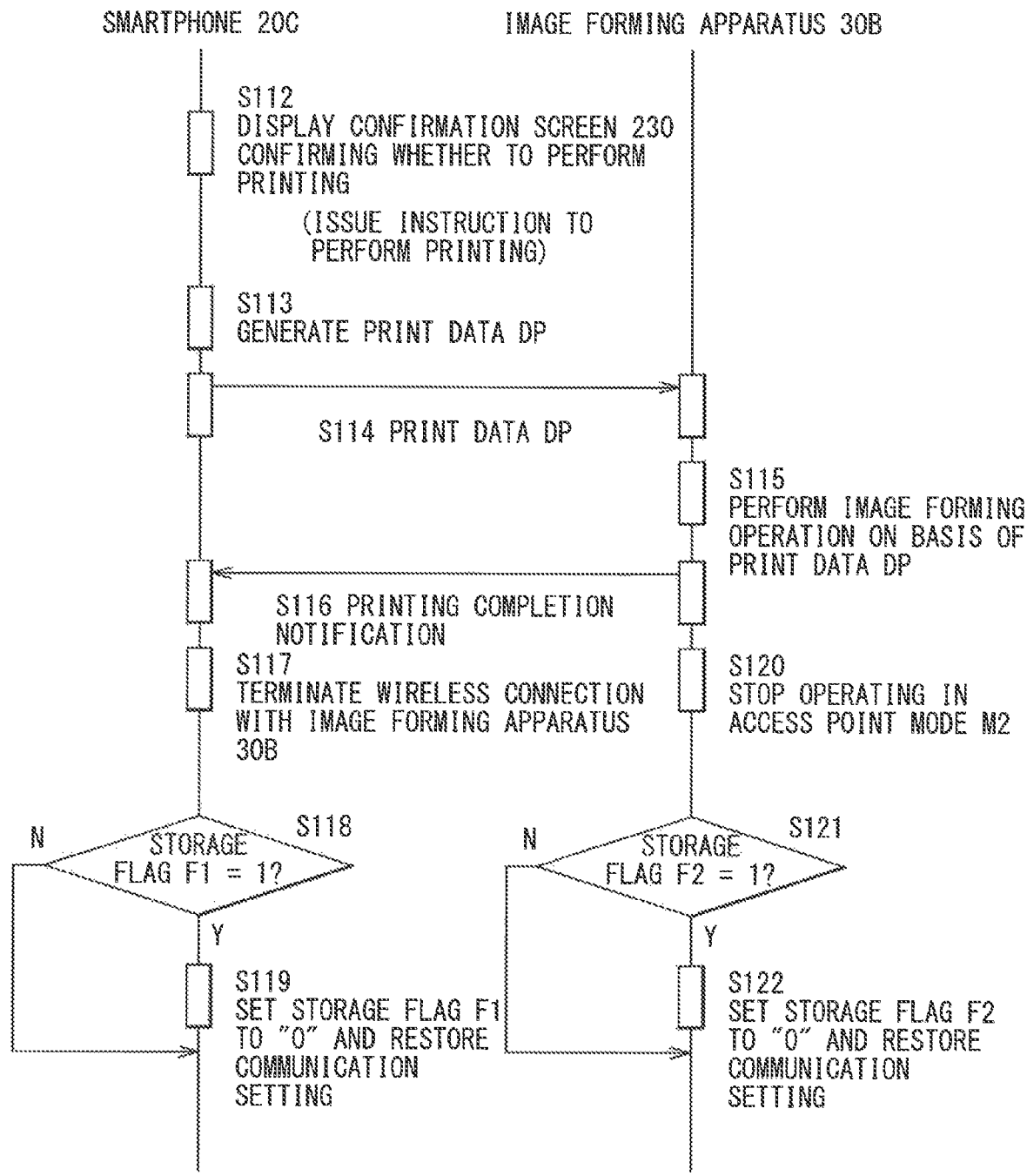
FIG. 13B is another sequence diagram illustrating an operation example of the image forming system according to an embodiment.

FIGS. 13A and 13B illustrate an operation example of the smartphone 20C and the image forming apparatus 30B. In FIGS. 13A and 13B, user operations are indicated in parentheses.

First, upon the user of the smartphone 20C issuing an instruction to start the printing application software 200 by operating the display operating section 21 of the smartphone 20C, the processing section 23 of the smartphone 20C may start the printing application software 200 installed in the storage 24 (step S101).

The display operating section 21 of the smartphone 20C may thereafter display a picture selecting screen 210 on the basis of an instruction from the processing section 23 that executes the display operating program 201 (step S102).

Figure 14:
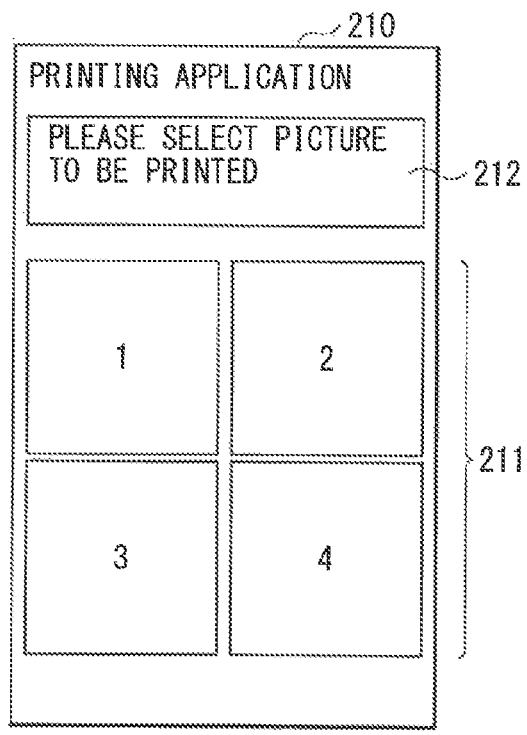
FIG. 14 is a diagram illustrating an example of a display screen of the smartphone illustrated in FIG. 4.

FIG. 14 illustrates an example of the picture selecting screen 210 displayed by the display operating section 21 of the smartphone 20C. The picture selecting screen 210 may include a picture list display section 211 and a message display section 212. A thumbnail list of pictures may be displayed in the picture list display section 211, and a message for the user may be displayed in the message display section 212. In this example, a message prompting the user to select a picture may be displayed in the message display section 212.

The user may select a picture to be printed from the thumbnail list of pictures displayed by the display operating section 21 of the smartphone 20C by operating the display operating section 21.

Thereafter, on the basis of an instruction from the processing section 23 that executes the display operating program 201, the display operating section 21 of the smartphone 20C may display an instructing screen 220 prompting the user to select "Print from Smartphone" by operating the image forming apparatus 30 that is to perform the printing, i.e., the image forming apparatus 30B in this example (step S103).

Figure 15:
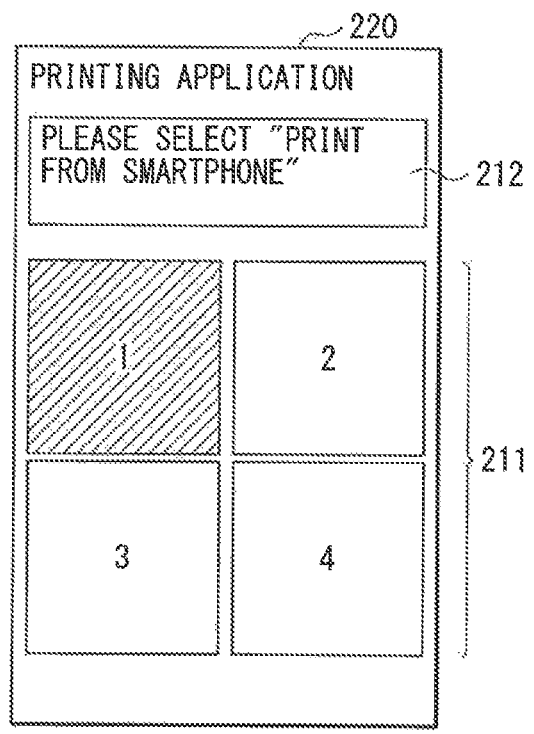
FIG. 15 is a diagram illustrating another example of the display screen of the smartphone illustrated in FIG. 4.

FIG. 15 illustrates an example of the instructing screen 220 displayed by the display operating section 21 of the smartphone 20C. In the picture list display section 211 of this instructing screen 220, among a plurality of thumbnails, the thumbnail of the picture selected by the user may be displayed with hatching in this example. Further, in the message display section 212, a message prompting the user to select "Print from Smartphone" may be displayed.

The user may select "Print from Smartphone" from a menu by operating the display operating section 31 of the image forming apparatus 30 that is to perform the printing, i.e., the image forming apparatus 30B in this example.

Figure 16:
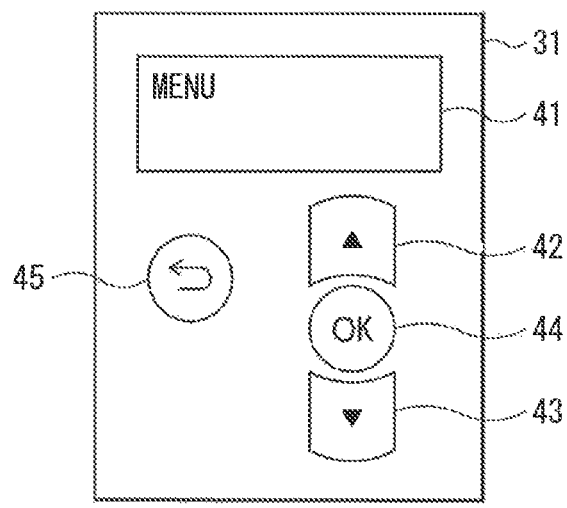
FIG. 16 is a diagram illustrating an operation example of the display operating section illustrated in FIG. 9.
Figure 17:
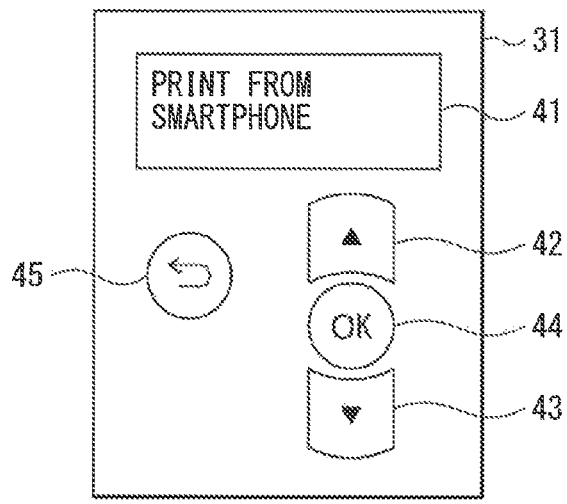
FIG. 17 is another diagram illustrating an operation example of the display operating section illustrated in FIG. 9.
Figure 18:
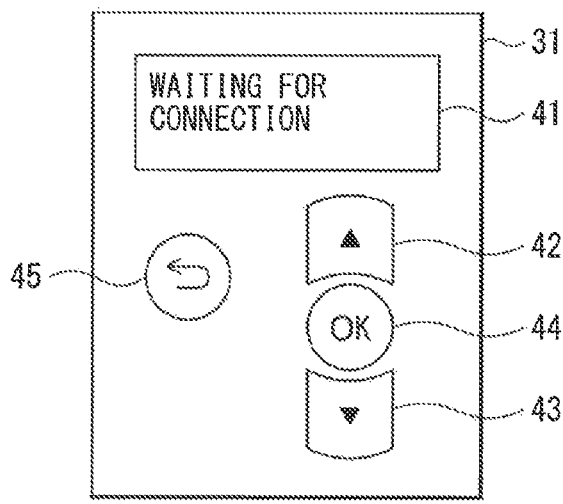
FIG. 18 is still another diagram illustrating an operation example of the display operating section illustrated in FIG. 9.

FIGS. 16 to 18 each illustrate an example of the display operating section 31 of the image forming apparatus 30B. Upon the user operating the up button 42 in the standby screen illustrated in FIG. 9, for example, the display section 41 of the display operating section 31 may display an item "Menu" as illustrated in FIG. 16. Thereafter, upon the user further operating the up button 42 or operating the down button 43, for example, the display section 41 of the display operating section 31 may display an item "Print from Smartphone" as illustrated in FIG. 17. Thereafter, as the user operates the "OK" button 44, "Print from Smartphone" may be selected.

The display operating section 31 of the image forming apparatus 30B may receive the selection of "Print from Smartphone" from the user in this manner (step S104). Thus, the display section 41 of the display operating section 31 may display information indicating that the image forming apparatus 30B is "Waiting for Connection" as illustrated in FIG. 18.

In the smartphone 20C, after the instructing screen 220 has been displayed in step S103, the controller 22 may determine whether the storage 24 holds any communication setting information INF other than the communication setting information INF20 stored when the printing application software 200 has been installed (step S105). In a case where it is determined in step S105 that the storage 24 holds no communication setting information INF other than the communication setting information INF20 ("N" in step S105), the processing may proceed to step S107. In other words, in this case, since there is no communication setting that is usually used in the smartphone 20C, the processing may proceed to step S107.

In a case where it is determined in step S105 that the storage 24 holds communication setting information INF other than the communication setting information INF20 ("Y" in step S105), the controller 22 may determine that there is communication setting that is usually used and set, to "1", a storage flag F1 that indicates whether the communication setting information INF is held (step S106). In other words, in this case, since there is communication setting that is usually used in the smartphone 20C, the controller 22 may set the storage flag F1 to "1" in order to restore the communication setting at a later time. Thereafter, the processing may proceed to step S107.

In this example, the storage 24 of the smartphone 20C may store, aside from the communication setting information INF20, the communication setting information INF9 directed to establishing of the wireless communication W with the access point 9 installed in the Tokyo office, as illustrated in FIGS. 4 and 5 ("Y" in step S105), and thus the storage flag F1 may be set to "1" in step S106.

Thereafter, the controller 22 of the smartphone 20C may configure the communication setting of the data communication module 120 on the basis of the communication setting information INF20 held in the storage 24 (step S107). In one example, the controller 22 may configure the communication setting of the data communication module 120 by temporarily storing the communication setting information INF20 held in the storage 24 into the storage 122 of the data communication module 120. In other words, in this example, prior to step S107, the storage 122 of the smart-phone 20C may hold the communication setting information INF9 directed to establishing of the wireless communication W with the access point 9 installed in the Tokyo office, and thus the controller 22 may temporarily store the communication setting information INF20 into the storage 122. Thereafter, the smartphone 20C may start the wireless communication W on the basis of the new communication setting.

In the image forming apparatus 30B, after the selection of "Print from Smartphone" from the user has been received in step S104, the controller 32 may determine whether the storage 33 holds any communication setting information INF other than the communication setting information INF20 stored when the firmware has been installed (step S108). In a case where it is determined in step S108 that the storage 33 holds no communication setting information INF other than the communication setting information INF20 ("N" in step S108), the processing may proceed to step S110. In other words, in this case, since there is no communication setting that is usually used in the image forming apparatus 30B, the processing may proceed to step S110.

In a case where it is determined in step S108 that the storage 33 holds communication setting information INF other than the communication setting information INF20 ("Y" in step S108), the controller 32 may set, to "1", a storage flag F2 that indicates whether the communication setting information INF is held (step S109). In other words, in this case, since there is communication setting that is usually used in the image forming apparatus 30B, the controller 32 may set the storage flag F2 to "1" in order to restore the communication setting at a later time. Thereafter, the processing may proceed to step S110.

In this example, the storage 33 of the image forming apparatus 30B may hold, aside from the communication setting information INF20, the communication setting information INF10 directed to establishing of the wireless communication W with the access point 10 installed in the Osaka office, as illustrated in FIGS. 8 and 10 ("Y" in step S108), and thus the storage flag F2 may be set to "1" in step S109.

Thereafter, the image forming apparatus 30B may configure the communication setting of the data communication module 130 on the basis of the communication setting information INF20 held in the storage 33 and start operating in the access point mode M2 (step S110). In one example, the controller 32 of the image forming apparatus 30B may configure the communication setting of the data communication module 130 by temporarily storing the communication setting information INF20 held in the storage 33 into the storage 132 of the data communication module 130. In other words, in this example, prior to step S110, the storage 132 of the image forming apparatus 30B may hold the communication setting information INF10 directed to establishing of the wireless communication W with the access point 10, and thus the controller 32 may temporarily store the communication setting information INF20 into the storage 132. Thereafter, the data communication module 130 of the image forming apparatus 30B may start the wireless communication W in the access point mode M2 on the basis of an instruction from the controller 32. In other words, in this example, prior to step S110, the data communication module 130 of the image forming apparatus 30B may operate in the infrastructure mode M1, and thus the data communication module 130 may switch the operation mode M to the access point mode M2 on the basis of an instruction from the controller 32.

In this manner, in step S107, the smartphone 20C may configure the communication setting on the basis of the communication setting information INF20 and start the wireless communication W on the basis of the new communication setting. In step S110, the image forming apparatus 30B may configure the communication setting on the basis of the communication setting information INF20 and start the wireless communication W in the access point mode M2 on the basis of the new communication setting. As a result, the smartphone 20C and the image forming apparatus 30B may establish the wireless communication W therebetween (step S111). At this point, the controller 131 of the image forming apparatus 30B that operates in the access point mode M2 may also operate as a dynamic host configuration protocol (DHCP) server and assign an internet protocol (IP) address to the smartphone 20C.

Upon the controller 22 of the smartphone 20C detecting the establishment of the wireless communication W in step S111, the display operating section 21 of the smartphone 20C may display a confirmation screen 230 directed to confirming, on the basis of an instruction from the processing section 23 that executes the display operating program 201, whether to perform the printing (step S112).

Figures 19, 20:
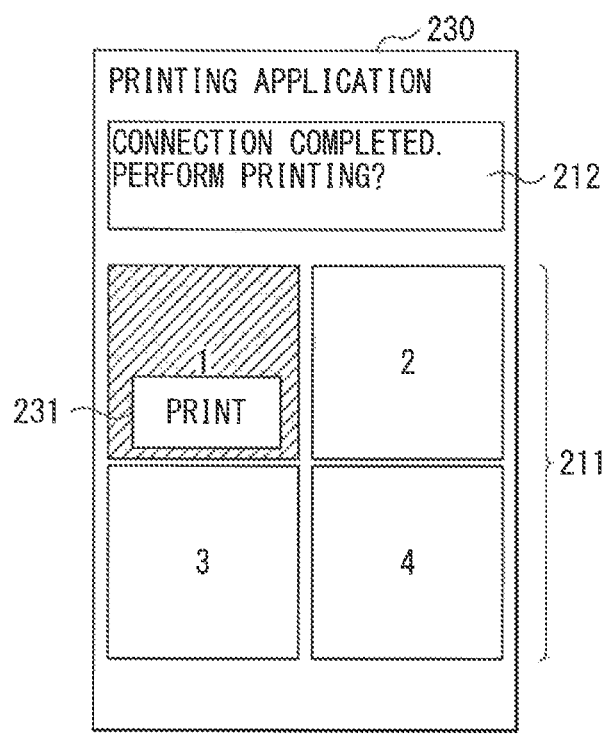
FIG. 19 is a diagram illustrating another example of the display screen of the smartphone illustrated in FIG. 4.
FIG. 20 is a diagram illustrating an example of a printing completion notification illustrated in FIG. 13B.

FIG. 19 illustrates an example of the confirmation screen 230 displayed by the display operating section 21 of the smartphone 20C. In the message display section 212 of this confirmation screen 230, a message indicating that the wireless communication W has been established, i.e., "Connection Completed," and a message confirming whether to perform the printing may be displayed. Further, a print button 231 may be displayed at a position corresponding to the thumbnail of the picture selected by the user in the picture list display section 211.

The user may issue an instruction to perform the printing by operating the print button 231 displayed by the display operating section 21 of the smartphone 20C.

Thereafter, the processing section 23 of the smartphone 20C may generate the print data DP directed to printing of the picture selected by the user, by executing the print data processing program 202 (step S113).

Thereafter, the data communication module 120 of the smartphone 20C may transmit the print data DP to the data communication module 130 of the image forming apparatus 30B through the wireless communication W established in step S111 (step S114). The data communication module 130 of the image forming apparatus 30B may receive this print data DP.

Thereafter, the image forming section 34 of the image forming apparatus 30B may form an image on a recording medium on the basis of the print data DP (step S115).

Thereafter, the data communication module 130 of the image forming apparatus 30B may transmit a printing completion notification to the data communication module 120 of the smartphone 20C through the wireless communication W established in step S111 (step S116). The data communication module 120 of the smartphone 20C may receive this printing completion notification.

FIG. 20 illustrates an example of the printing completion notification. The printing completion notification may include header information, information on a transmitter IP address, information on a receiver IP address, and data. This data may indicate information indicating that the printing has been completed.

Upon the smartphone 20C receiving this printing completion notification, the data communication module 120 of the smartphone 20C may thereafter terminate the wireless connection with the image forming apparatus 30B (step S117).

Thereafter, the controller 22 of the smartphone 20C may determine whether the storage flag F1 is "1," i.e., whether F1=1 (step S118). In a case where the storage flag F1 is not "1" ("N" in step S118), this sequence may be terminated. In other words, in this case, since there is no communication setting that is usually used in the smartphone 20C, the smartphone 20C may terminate the wireless communication W.

In a case where the storage flag F1 is "1" ("Y" in step S118), there is communication setting that is usually used in the smartphone 20C, and thus the controller 22 of the smartphone 20C may set the storage flag F1 to "0" and restore the communication setting of the data communication module 120 to the communication setting that is usually used (step S119). Thereafter, this sequence may be terminated.

In this example, since the storage flag F1 is set to "1" in step S106 ("Y" in step S118), the controller 22 may set the storage flag F1 to "0" and restore the communication setting information INF in the storage 122 of the data communication module 120 to the communication setting information INF9 having been held in the storage 122 prior to step S107. Thus, the smartphone 20C may be able to connect to the access point 9 in the Tokyo office when the user returns to the Tokyo office.

After transmitting the printing completion notification in step S116, the image forming apparatus 30B may stop operating in the access point mode M2 (step S120).

Thereafter, the controller 32 of the image forming apparatus 30B may determine whether the storage flag F2 is "1," i.e., whether F2=1 (step S121). In a case where the storage flag F2 is not "1" ("N" in step S121), this sequence may be terminated. In other words, in this case, since there is no communication setting that is usually used in the image forming apparatus 30B, the image forming apparatus 30B may terminate the wireless communication W.

In a case where the storage flag F2 is "1" ("Y" in step S121), there is communication setting that is usually used in the image forming apparatus 30B, and thus the controller 32 of the image forming apparatus 30B may set the storage flag F2 to "0" and restore the communication setting of the data communication module 130 to the communication setting that is usually used (step S122). Thereafter, this sequence may be terminated.

In this example, since the storage flag F2 is set to "1" in step S109 ("Y" in step S121), the controller 32 may set the storage flag F2 to "0" and restore the communication setting information INF in the storage 132 of the data communication module 130 to the communication setting information INF10 having been held in the storage 132 prior to step S110. Thus, the image forming apparatus 30B may operate in the infrastructure mode M1 and reestablish the wireless communication W with the access point 10.

As described thus far, aside from the communication setting information INF that is usually used, the fixed communication setting information INF20 may be provided in the image forming system 1. In the image forming system 1, when the user having the smartphone 20C makes a business trip to the Osaka office, for example, the image forming apparatus 30B in the Osaka office may be caused to operate in the access point mode M2, and the communication settings of the smartphone 20C and the image forming apparatus 30B may be configured on the basis of the stated fixed communication setting information INF20. Accordingly, the user of the smartphone 20C need not go through the trouble of inputting an SSID or an encryption key in the image forming system 1, and thus it is possible to increase the user-friendliness.

In other words, in a case where the smartphone 20C is connected to the image forming apparatus 30B via the access point 10, the communication setting of the smartphone 20C may need configuring in accordance with the communication setting information INF10 of the access point 10. In other words, in this case, the user of the smartphone 20C may need to input an SSID or an encryption key by operating the smartphone 20C. In one example, in a case where a network administrator has changed the SSID or the encryption key, the user of the smartphone 20C may need to input an SSID or an encryption key every time they are changed. In this respect, in the image forming system 1, the image forming apparatus 30B may be caused to operate in the access point mode M2, and the communication settings of the smartphone 20C and the image forming apparatus 30B may be configured on the basis of the fixed communication setting information INF20. Accordingly, the user of the smartphone 20C need not go through the trouble of inputting an SSID or an encryption key, and thus it is possible to increase the user-friendliness.

Moreover, in the image forming system 1, the communication settings of the smartphone 20C and the image forming apparatus 30B may be restored after printing has been completed, which renders it unnecessary for the user to carry out an operation of restoring the communication settings, and thus it is possible to increase the user-friendliness.

Moreover, in the image forming system 1, in a case where there is no communication setting that is usually used, the wireless communication W may not be reestablished after printing has been completed. Thus, it is possible to suppress an occurrence of a radio wave in the image forming system 1. As a result, it is possible to reduce the risk of trouble in a building where devices, such as a medical device or a measurement device, that may experience performance reduction associated with radio waves are present, for example.

Example Effects

As described thus far, since, aside from the communication setting information that is usually used, the fixed communication setting information may be provided in the present example embodiment, the user need not go through the trouble of inputting an SSID or an encryption key, and thus it is possible to increase the user-friendliness.

In the present example embodiment, since the communication settings of the smartphone and the image forming apparatus may be restored after printing has been completed, it is possible to increase the user-friendliness.

In the present example embodiment, in a case where there is no communication setting that is usually used, the wireless communication W may not be reestablished after printing has been completed, and thus it is possible to suppress an occurrence of a radio wave. Accordingly, it is possible to reduce the risk of trouble in a building where devices, such as a medical device or a measurement device, that may experience performance reduction associated with radio waves are present.

Modification Example 1-1

In the foregoing example embodiment, the image forming system 1 may include the smartphone 20, but this is not a limiting example. Alternatively, an image forming system may include, for example, a mobile terminal, such as a tablet terminal, a laptop personal computer, or a personal digital assistant (PDA).

Modification Example 1-2

In the foregoing example embodiment, one smartphone 20, i.e., the smartphone 20C in the above example, may be wirelessly connected to the image forming apparatus 30B that operates in the access point mode M2, but this is not a limiting example. Alternatively, a plurality of smartphones 20 may be wirelessly connected simultaneously to the image forming apparatus 30B that operates in the access point mode M2, for example. In this case, similarly to the case of the foregoing example embodiment illustrated in FIG. 13A, the smartphones 20 may each start the printing application software 200 (step S101), display the picture selecting screen 210 (step S102), display the instructing screen 220 prompting the user to select "Print from Smartphone" (step S103), and configure the communication setting on the basis of the communication setting information INF20 (steps S105 to S107). In a similar manner, the image forming apparatus 30B may receive the selection of "Print from Smartphone" (step S104), configure the communication setting on the basis of the communication setting information INF20, and start operating in the access point mode M2 (steps S108 to S110). Thus, the smartphones 20 and the image forming apparatus 30B may establish the wireless communication W therebetween (step S111). At this point, the controller 131 of the image forming apparatus 30B that operates in the access point mode M2 may also operate as a DHCP server and assign different IP addresses to the respective smartphones 20. The smartphones 20 may include a first smartphone and a second smartphone. The first smartphone and the second smartphone may each have a configuration similar to that of the smartphone 20C illustrated in FIG. 4. In this example, the first smartphone may correspond to a "first mobile terminal" in one specific but non-limiting embodiment of the technology. The storage 24 of the first smartphone may correspond to "first storage" in one specific but non-limiting embodiment of the technology. The data communication module 120 of the first smartphone may correspond to a "first communicator" in one specific but non-limiting embodiment of the technology. The controller 22 and the processing section 23 of the first smartphone may correspond to a "first setting section" in one specific but non-limiting embodiment of the technology. The second smartphone may correspond to a "second mobile terminal" in one specific but non-limiting embodiment of the technology. The storage 24 of the second smartphone may correspond to "third storage" in one specific but non-limiting embodiment of the technology. The data communication module 120 of the second smartphone may correspond to a "third communicator" in one specific but non-limiting embodiment of the technology. The controller 22 and the processing section 23 of the second smartphone may correspond to a "third setting section" in one specific but non-limiting embodiment of the technology.

Modification Example 1-3

In the foregoing example embodiment, the image forming apparatus 30B may have two operation modes M, but this is not a limiting example. Alternatively, the smartphone 20C may have the two operation modes M, i.e., the infrastructure mode M1 and the access point mode M2, for example. In this case as well, when the user having the smartphone 20C makes a business trip to the Osaka office, for example, the smartphone 20C may be caused to operate in the access point mode M2, and the communication settings of the smartphone 20C and the image forming apparatus 30B may be configured on the basis of the fixed communication setting information INF20. Thus, it is possible to increase the user-friendliness of the smartphone 20C.

Modification Example 1-4

Figure 21:
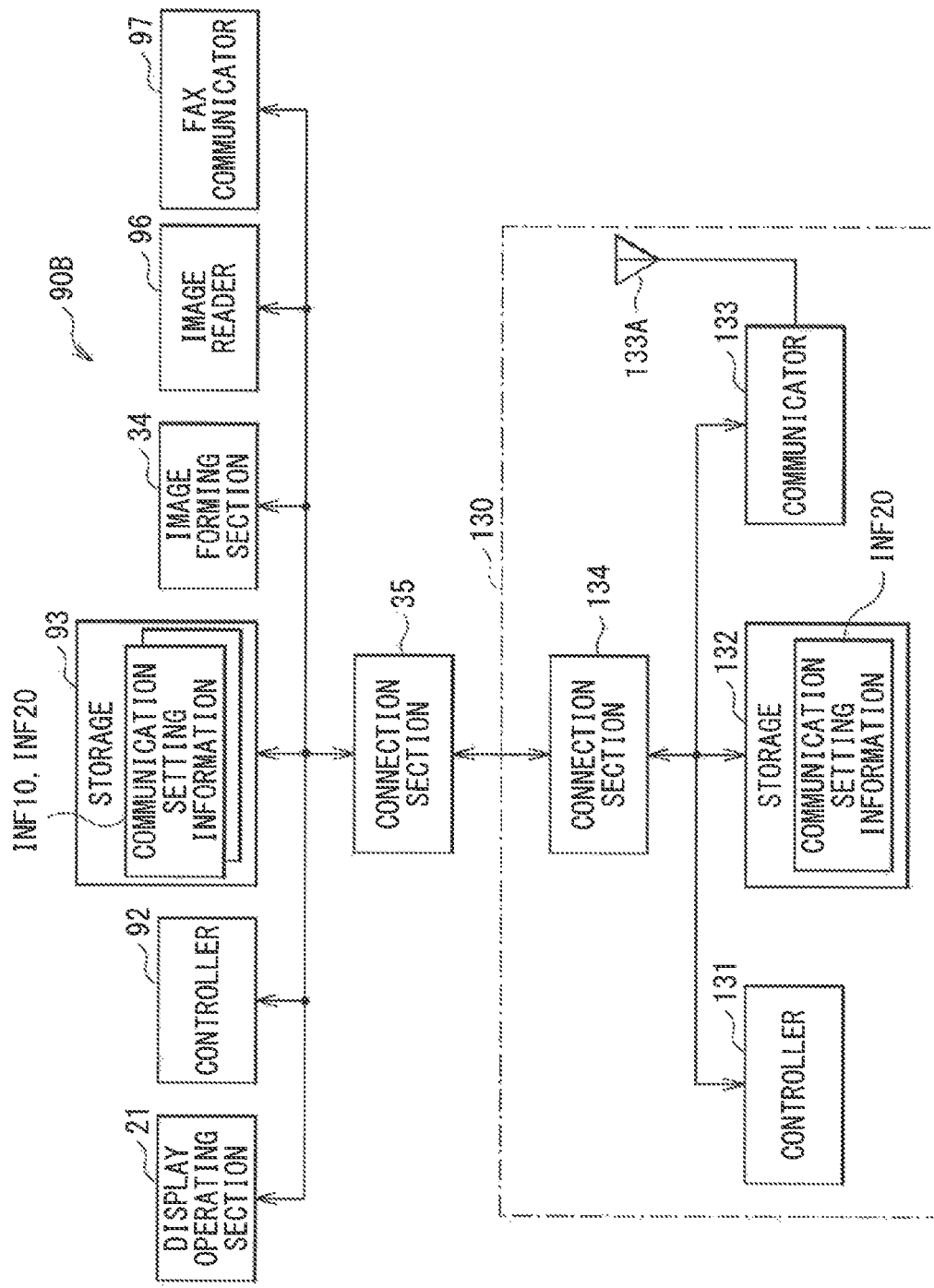
FIG. 21 is a block diagram illustrating a configuration example of a multifunction peripheral according to a modification example.

In the foregoing example embodiment, the smartphone 20C may transmit the print data DP to the image forming apparatus 30B, but this is not a limiting example. For example, in place of the image forming apparatus 30B, a so-called multifunction peripheral (MFP) having functions such as a copy function, a fax function, a scan function, or a print function may be used. FIG. 21 illustrates a configuration example of a multifunction peripheral 90B. The multifunction peripheral 90B may include a controller 92, storage 93, an image reader 96, and a FAX communicator 97. The controller 92 may control the operation of the multifunction peripheral 90B. The storage 93 may store, for example, a program to be executed in the multifunction peripheral 90B, communication data, and various pieces of setting data. The image reader 96 may read information recorded on a reading medium such as paper and may include a contact image sensor (CIS), for example. The FAX communicator 97 may transmit and receive FAX data to and from a communicating party via a telephone circuit. An image forming system may include such a multifunction peripheral 90B, and data, i.e., scan data DS, read by the image reader 96 may be transmitted to the smartphone 20C through the wireless communication W, for example.

Modification Example 1-5

In the foregoing example embodiment, as illustrated in FIGS. 13A and 13B, the smartphone 20C may terminate the wireless connection with the image forming apparatus 30B immediately after receiving the printing completion notification, but this is not a limiting example. Alternatively, for example, the smartphone 20C may keep the wireless connection for a while after receiving the printing completion notification. In one example, upon the wireless communication being established in step S111, the display operating section 21 of the smartphone 20C may display a setting screen in which the user may set the duration for which the wireless communication is to be kept. This setting screen may, for example, display, to the user, a plurality of options, such as one hour, three hours, or one day, and the user may select one of these options. In this case, the smartphone 20C may terminate the wireless connection with the image forming apparatus 30B when the set duration has elapsed.

2. Second Example Embodiment

An image forming system 2 according to a second example embodiment will now be described. In the present example embodiment, wireless communication W may be established with the use of, aside from the communication setting information that is usually used, communication setting information that is automatically changed each time an image forming apparatus is powered on, for example. In other words, in the foregoing first example embodiment, aside from the communication setting information that is usually used, the fixed communication setting information may be used. Alternatively, in the present example embodiment, the communication setting information that is to be automatically changed may be used. Components that are substantially identical to those of the image forming system 1 according to the foregoing first example embodiment will be given identical reference characters, and descriptions thereof will be omitted as appropriate.

As illustrated in FIGS. 1A and 1B, the image forming system 2 may include: the access point 10; three smartphones 50, i.e., smartphones 50A, 50B, and 50C; and two image forming apparatuses 60, i.e., image forming apparatuses 60A and 60B. The smartphones 50 may each have a function of carrying out wireless communication W with the use of a wireless LAN as well as a function of carrying out communication with the use of near-field communication (NFC). In a similar manner, the image forming apparatuses 60 may each have a function of carrying out the wireless communication W with the use of a wireless LAN as well as a function of carrying out communication with the use of near-field communication.

Smartphone 50

A configuration example of the smartphones 50 will now be described with the smartphone 50C serving as an example.

Figure 22:
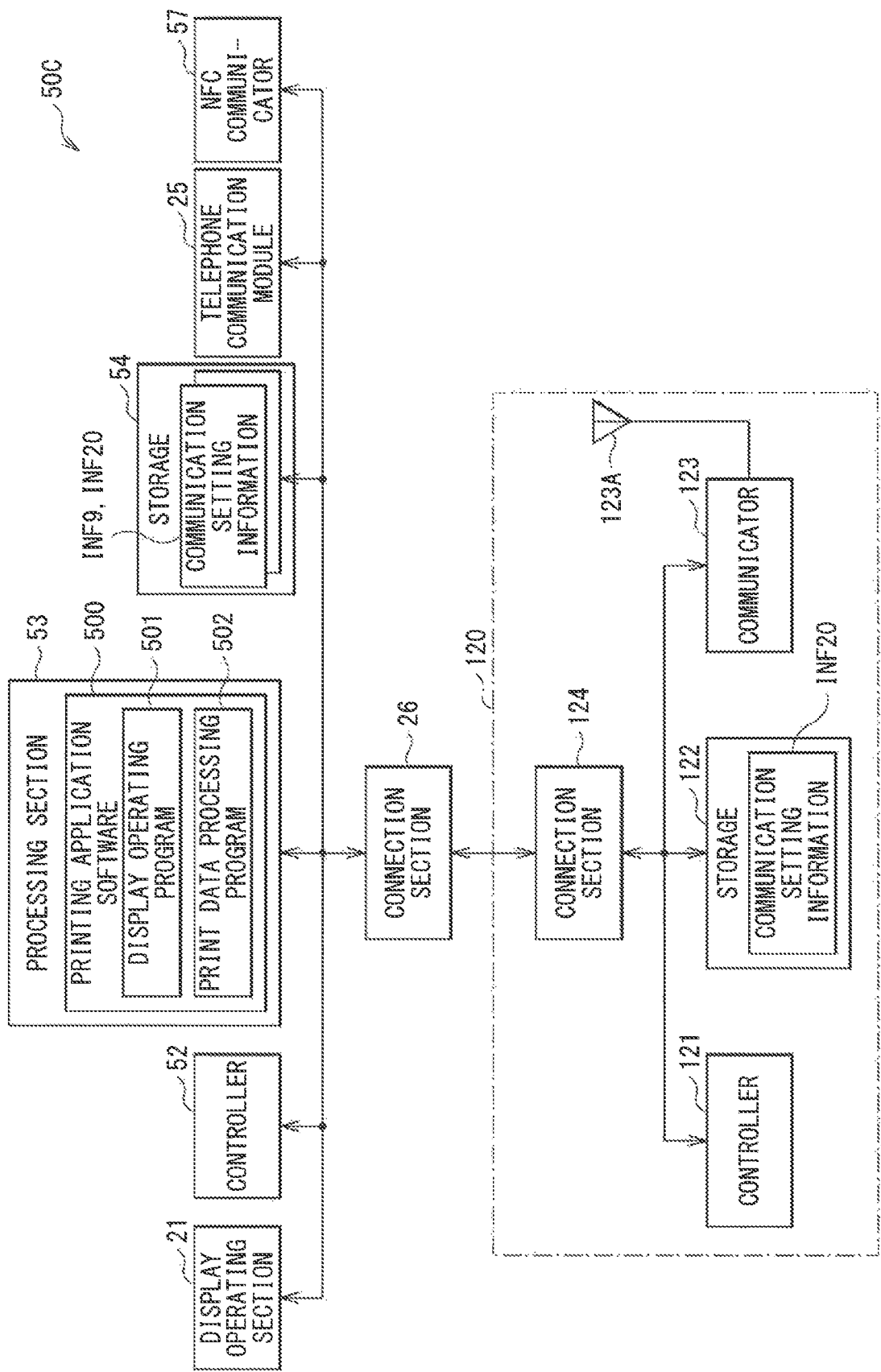
FIG. 22 is a block diagram illustrating a configuration example of a smartphone according to an embodiment.

FIG. 22 illustrates a configuration example of the smartphone 50C. The smartphone 50C may include a controller 52, a processing section 53, storage 54, and an NFC communicator 57.

The controller 52 may control the operation of the smartphone 50C. The processing section 53 may carry out various processes by executing a program. The smartphone 50C may have printing application software 500 installed therein, and the processing section 53 may execute this printing application software 500. The printing application software 500 may include a display operating program 501 and a print data processing program 502.

The storage 54 may store, for example, a program to be executed in the smartphone 50C, communication data, and various pieces of setting data. The storage 54 may hold the installed printing application software 500. Further, the storage 54 may hold two pieces of communication setting information INF9 and INF20. The communication setting information INF20 may be generated by the image forming apparatus 60B. The smartphone 50C may receive the communication setting information INF20 from the image forming apparatus 60B by carrying out the near-field communication with the image forming apparatus 60B and store the communication setting information INF20 into the storage 54.

The NFC communicator 57 may carry out the near-field communication with an NFC reader-writer 66 of the image forming apparatus 60B. The NFC reader-writer 66 will be described later.

The description has been given thus far with the smartphone 50C serving as an example, and this description may also be applicable to the smartphones 50A and 50B in a similar manner. For example, in the smartphone 50A, the storage 122 of the data communication module 120 may hold the communication setting information INF10.

Thus, the smartphone 50A may be able to carry out the wireless communication W with the image forming apparatuses 60A and 60B via the access point 10, as illustrated in FIG. 1A, and may be able to carry out the wireless communication W with the image forming apparatus 60A via the access point 10, as illustrated in FIG. 1B.

[Image Forming Apparatus 60]

A configuration example of the image forming apparatuses 60 will now be described with the image forming apparatus 60B serving as an example.

Figure 23:
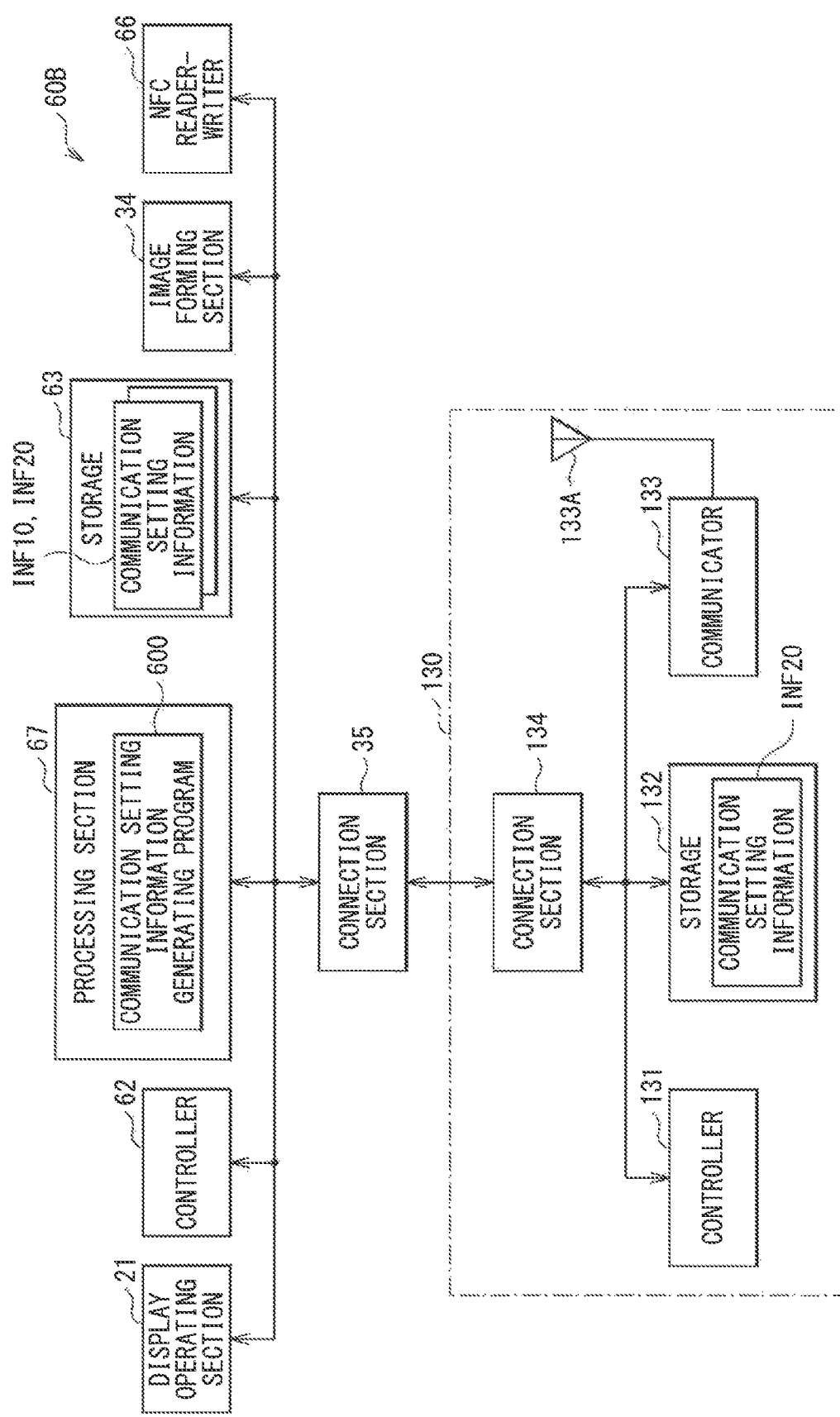
FIG. 23 is a block diagram illustrating a configuration example of an image forming apparatus according to an embodiment.

FIG. 23 illustrates a configuration example of the image forming apparatus 60B. The image forming apparatus 60B may include a controller 62, a processing section 67, storage 63, and the NFC reader-writer 66.

The controller 62 may control the operation of the image forming apparatus 60B. The processing section 67 may carry out various processes by executing a program. The controller 62 and the processing section 67 may include, for example, a module that includes a CPU and a RAM. Firmware that includes a communication setting information generating program 600 may be installed in the image forming apparatus 60B, and the processing section 67 may execute the communication setting information generating program 600. The communication setting information generating program 600 may, for example, generate the communication setting information INF20 with the use of, for example, a random number each time the image forming apparatus 60B is powered on. In other words, an SSID and an encryption key included in the communication setting information INF20 may be random.

The storage 63 may store, for example, a program to be executed in the image forming apparatus 60B, communication data, and various pieces of setting data. The storage 63 may hold two pieces of communication setting information INF10 and INF20. The communication setting information INF20 may be generated by the processing section 67 that executes the communication setting information generating program 600 and stored into the storage 63.

The NFC reader-writer 66 may carry out the near-field communication with the NFC communicator 57 of any of the smartphones 50.

The description has been given thus far with the image forming apparatus 60B serving as an example, and this description may also be applicable to the image forming apparatus 60A in a similar manner. In the image forming apparatus 60A, the storage 132 of the data communication module 130 may hold the communication setting information INF10. Thus, the image forming apparatus 60A may be able to carry out the wireless communication W with the smartphones 50A and 50B via the access point 10, as illustrated in FIGS. 1A and 1B.

In this example, the smartphone 50C may correspond to a "first mobile terminal" in one specific but non-limiting embodiment of the technology. The image forming apparatus 60B may correspond to an "image forming apparatus" in one specific but non-limiting embodiment of the technology. The NFC communicator 57 may correspond to an "acquiring section" in one specific but non-limiting embodiment of the technology. The storage 54 may correspond to "first storage" in one specific but non-limiting embodiment of the technology. The controller 52 and the processing section 53 may correspond to a "first setting section" in one specific but non-limiting embodiment of the technology. The storage 63 may correspond to "second storage" in one specific but non-limiting embodiment of the technology. The NFC reader-writer 66 may correspond to a "supplying section" in one specific but non-limiting embodiment of the technology. The controller 62 may correspond to a "second setting section" in one specific but non-limiting embodiment of the technology. The processing section 67 may correspond to an "information generator" in one specific but non-limiting embodiment of the technology.

Figure 24A:
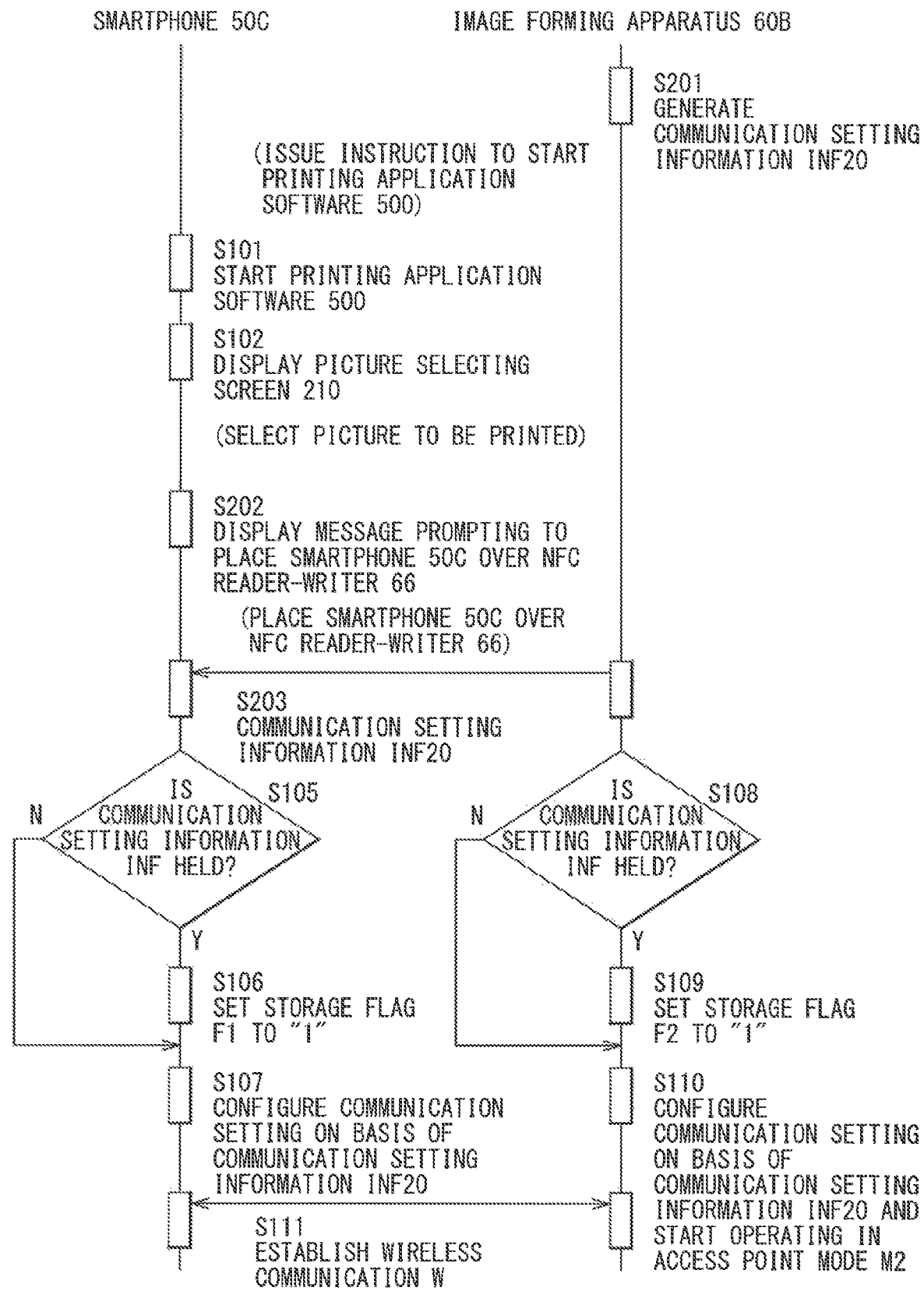
FIG. 24A is a sequence diagram illustrating an operation example of an image forming system according to an embodiment.
Figure 24B:
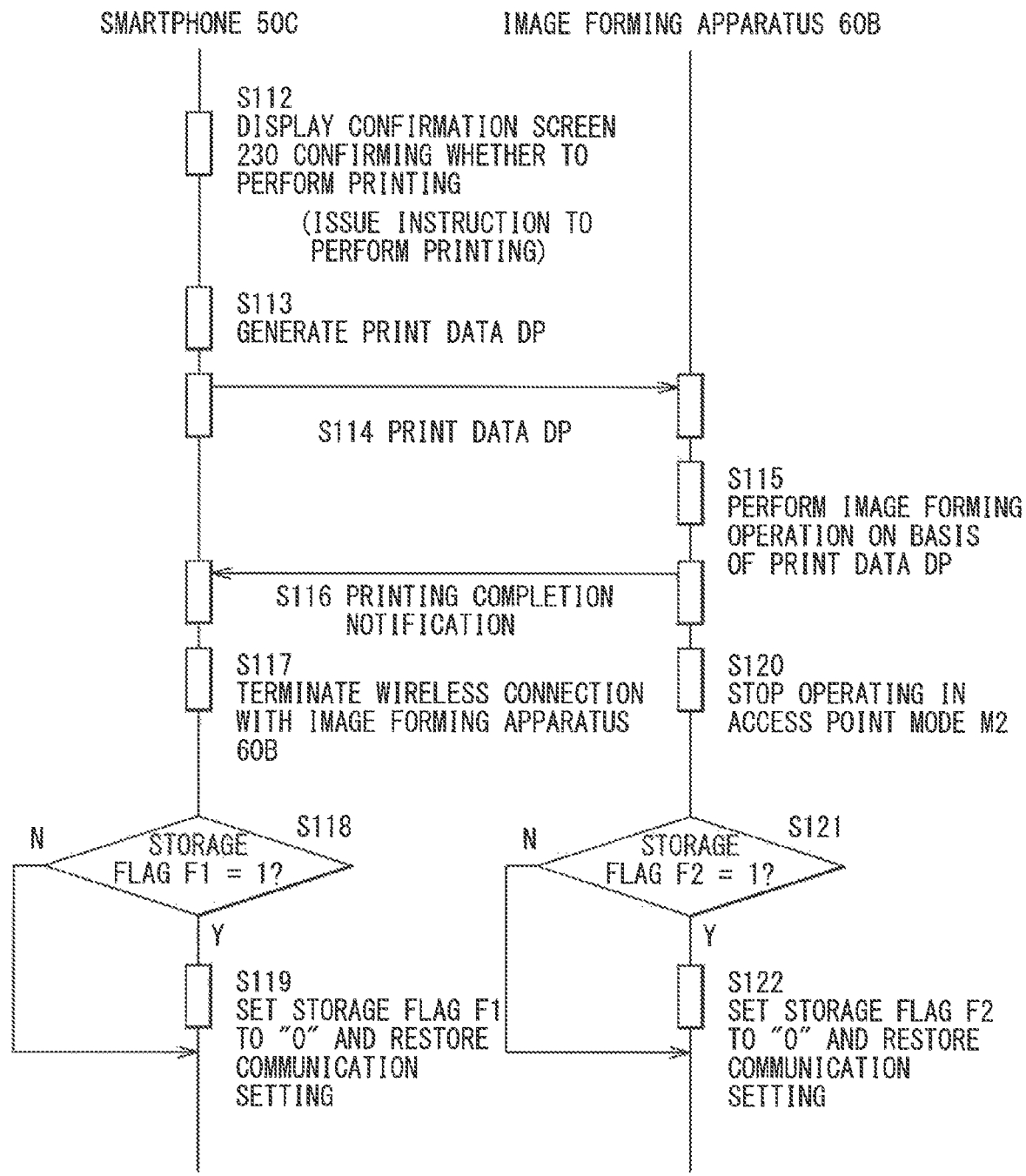
FIG. 24B is another sequence diagram illustrating an operation example of the image forming system according to an embodiment.

FIGS. 24A and 24B illustrate an operation example of the smartphone 50C and the image forming apparatus 60B.

The processing section 67 of the image forming apparatus 60B may generate the communication setting information INF20 by executing the communication setting information generating program 600 when the image forming apparatus 60B is powered on (step S201). Thereafter, the storage 63 may hold the communication setting information INF20 generated by the processing section 67.

Thereafter, upon the user of the smartphone 50C issuing an instruction to start the printing application software 500, the processing section 53 of the smartphone 50C may start the printing application software 500 installed in the storage 54 (step S101), and the display operating section 21 of the smartphone 50C may display the picture selecting screen 210 on the basis of an instruction from the processing section 53 that executes the display operating program 501 (step S102). The user may select a picture to be printed from the thumbnail list of the pictures displayed by the display operating section 21 of the smartphone 50C by operating the display operating section 21.

Thereafter, on the basis of the instruction from the processing section 53 that executes the display operating program 501, the display operating section 21 of the smartphone 50C may display an instructing screen 520 prompting the user to place the smartphone 50C over the NFC reader-writer 66 of the image forming apparatus 60 that is to perform the printing, i.e., the image forming apparatus 60B in this example (step S202).

Figure 25:
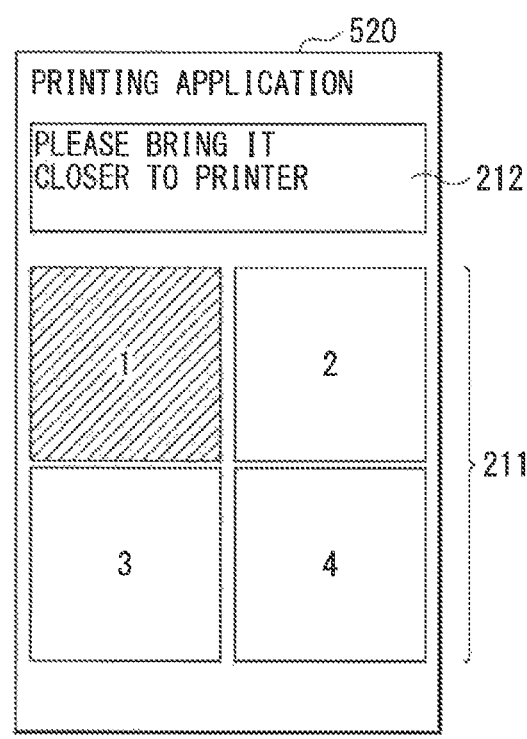
FIG. 25 is a diagram illustrating an example of a display screen of the smartphone illustrated in FIG. 22.

FIG. 25 illustrates an example of the instructing screen 520 displayed by the display operating section 21 of the smartphone 50C. In the picture list display section 211 of the instructing screen 520, among a plurality of thumbnails, the thumbnail of the picture selected by the user may be displayed with hatching in this example. Further, in the message display section 212, a message prompting the user to place the smartphone 50C over the NFC reader-writer 66 of the image forming apparatus 60 that is to perform the printing, i.e., the image forming apparatus 60B in this example, is displayed.

The user may place the smartphone 50C over the NFC reader-writer 66 of the image forming apparatus 60 that is to perform the printing, i.e., the image forming apparatus 60B in this example. Thus, the NFC communicator 57 of the smartphone 50C may transmit an acquisition request for the communication setting information INF20 to the NFC reader-writer 66 of the image forming apparatus 60B.

Thereafter, the NFC reader-writer 66 of the image forming apparatus 60B may transmit, to the NFC communicator 57 of the smartphone 50C, the communication setting information INF20 held in the storage 63 through the near-field communication on the basis of the acquisition request for the communication setting information INF20 (step S203). The NFC communicator 57 of the smartphone 50C may receive this communication setting information INF20. The storage 54 of the smartphone 50C may hold this communication setting information INF20.

Thereafter, the controller 52 of the smartphone 50C may determine whether the storage 54 holds any communication setting information INF other than the communication setting information INF20 acquired through the near-field communication (step S105). In a case where it is determined in step S105 that the storage 54 holds no communication setting information INF other than the communication setting information INF20 ("N" in step S105), the processing may proceed to step S107.

In a case where it is determined in step S105 that the storage 54 holds communication setting information INF other than the communication setting information INF20 ("Y" in step S105), the controller 52 may determine that there is communication setting that is usually used and set, to "1", the storage flag F1 that indicates whether the communication setting information INF is held (step S106). Thereafter, the processing may proceed to step S107.

In this example, similarly to the case of the first example embodiment, the storage 54 of the smartphone 50C may hold, aside from the communication setting information INF20, the communication setting information INF9 directed to establishing of the wireless communication W with the access point 9 installed in the Tokyo office ("Y" in step S105), and thus the storage flag F1 may be set to "1" in step S106.

Thereafter, the controller 52 of the smartphone 50C may configure the communication setting of the data communication module 120 on the basis of the communication setting information INF20 held in the storage 54 (step S107). In one example, the controller 52 may configure the communication setting of the data communication module 120 by temporarily storing the communication setting information INF20 held in the storage 54 into the storage 122 of the data communication module 120. Thereafter, the smartphone 50C may start the wireless communication W on the basis of the new communication setting.

In the image forming apparatus 60B, after the NFC reader-writer 66 has transmitted the communication setting information INF20 to the smartphone 50C in step S203, the controller 62 may determine whether the storage 63 holds any communication setting information INF other than the communication setting information INF20 generated by the processing section 67 (step S108). In a case where it is determined in step S108 that the storage 63 holds no communication setting information INF other than the communication setting information INF20 ("N" in step S108), the processing may proceed to step S110.

In a case where it is determined in step S108 that the storage 63 holds communication setting information INF other than the communication setting information INF20 ("Y" in step S108), the controller 62 may set, to "1", the storage flag F2 that indicates whether the communication setting information INF is held (step S109). Thereafter, the processing may proceed to step S110.

In this example, similarly to the case of the first example embodiment, the storage 63 of the image forming apparatus 60B may hold, aside from the communication setting information INF20, the communication setting information INF10 directed to establishing of the wireless communication W with the access point 10 installed in the Osaka office ("Y" in step S108), and thus the storage flag F2 may be set to "1" in step S109.

Thereafter, the image forming apparatus 60B may configure the communication setting of the data communication module 130 on the basis of the communication setting information INF20 held in the storage 63 and start operating in the access point mode M2 (step S110). In one example, the controller 62 of the image forming apparatus 60B may configure the communication setting of the data communication module 130 by temporarily storing the communication setting information INF20 held in the storage 63 into the storage 132 of the data communication module 130. Thereafter, the data communication module 130 of the image forming apparatus 60B may start the wireless communication W in the access point mode M2 on the basis of an instruction from the controller 62.

In this manner, in step S107, the smartphone 50C may configure the communication setting on the basis of the communication setting information INF20 and start the wireless communication W on the basis of the new communication setting. Thereafter, in step S110, the image forming apparatus 60B may configure the communication setting on the basis of the communication setting information INF20 and start the wireless communication W in the access point mode M2 on the basis of the new communication setting. As a result, the smartphone 50C and the image forming apparatus 60B may establish the wireless communication W therebetween (step S111).

The operation that follows thereafter may be similar to that in the case of the image forming system 1 according to the first example embodiment as illustrated in FIG. 13B.

As described thus far, random communication setting information INF20 that is changed automatically each time the image forming apparatus 60 is powered on, for example, may be used in the image forming system 2. Thus, even in a case where the smartphones 50 are connected to the respective image forming apparatuses 60 that operate in the access point mode M2 with the use of a wireless LAN, for example, the communication setting information INF may differ from each other, and thus it is possible for the smartphones 50 and the respective image forming apparatuses 60 to carry out the wireless communication W independently. As a result, it is possible to increase the user-friendliness.

As described thus far, since random communication setting information INF20 may be used in the present example embodiment, it is possible to increase the user-friendliness. Other effects may be similar to those in the case of the first example embodiment described above.

Modification Example 2-1

In the foregoing example embodiment, the communication setting information generating program 600 may generate the random communication setting information INF20 each time the image forming apparatus 60B is powered on, for example, but this is not a limiting example. Alternatively, the communication setting information generating program may generate the random communication setting information INF20, for example, each time a predetermined time, e.g., one hour, has elapsed or may generate the random communication setting information INF20, for example, each time the smartphone 50 is placed over the NFC reader-writer 66.

Other Modification Examples

Each of the modification examples of the first example embodiment described above may be applied to the image forming system according to the foregoing second example embodiment.

Thus far, the technology has been described with reference to some example embodiments and modification examples. The technology, however, is not limited to these example embodiments and modification examples, and various other modifications are possible.

For example, the wireless communication W may be carried out with the use of a wireless LAN in the foregoing example embodiments, but this is not a limiting example. Alternatively, the wireless communication W may be carried out with the use of Bluetooth (registered trademark), for example.

Furthermore, the technology encompasses any possible combination of some or all of the various embodiments and the modifications described herein and incorporated herein. It is possible to achieve at least the following configurations from the above-described example embodiments of the technology.

(1)
An image forming system, including:
a first mobile terminal that transmits first image data by carrying out first wireless communication; and
an image forming apparatus that receives the first image data by carrying out the first wireless communication and forms an image on the basis of the first image data,
the first mobile terminal including
first storage that holds first communication setting information and is able to hold second communication setting information,
a first communicator that carries out the first wireless communication, and
a first setting section that, when the first communicator carries out the first wireless communication, selects the first communication setting information held in the first storage and configures communication setting of the first communicator on the basis of the first communication setting information,
the image forming apparatus including
second storage that holds the first communication setting information and is able to hold third communication setting information,
a second communicator that carries out the first wireless communication,
a second setting section that, when the second communicator carries out the first wireless communication, selects the first communication setting information held in the second storage and configures communication setting of the second communicator on the basis of the first communication setting information, and
an image forming section that forms an image on the basis of the first image data received by the second communicator.

(2)
The image forming system according to (1), in which
the second storage holds the third communication setting information, and
the second setting section configures the communication setting of the second communicator on the basis of the third communication setting information after the second communicator has carried out the first wireless communication.

(3)
The image forming system according to (1) or (2), in which
the first mobile terminal further includes an instructing section that prompts a user to perform a predetermined operation on the image forming apparatus, when the first communicator carries out the first wireless communication,
the image forming apparatus further includes an operation section that receives the predetermined operation, and
the second setting section selects the first communication setting information held in the second storage on the basis of an instruction from the operation section.

(4)
The image forming system according to any one of (1) to (3), in which the first communication setting information is predetermined communication setting information set in advance.

(5)
The image forming system according to any one of (1) to (4), in which
the second communicator has a plurality of operation modes including a first operation mode in which the image forming apparatus operates as a base station for the first wireless communication, and
the second setting section causes the second communicator to operate in the first operation mode, when the second communicator carries out the first wireless communication.

(6)
The image forming system according to any one of (1) to (5), in which
the first storage holds the second communication setting information, and
the first setting section configures the communication setting of the first communicator on the basis of the second communication setting information after the first communicator has carried out the first wireless communication.

(7)
The image forming system according to any one of (1) to (6), in which the first communication setting information includes a service set identifier, an encryption key, or both.

(8)
The image forming system according to any one of (1) to (7), in which
software including the first communication setting information is installed in the first mobile terminal, and
the first communication setting information is stored into the first storage when the software is installed.

(9)
The image forming system according to any one of (1) to (8), in which the image forming apparatus further includes an identifier appending section that assigns a first terminal identifier to the first mobile terminal, when the first communicator of the first mobile terminal carries out the first wireless communication.

(10)
The image forming system according to any one of (1) to (9), in which
the image forming apparatus further includes an image reader that generates second image data by reading information recorded on a reading medium, and transmits the second image data by carrying out the first wireless communication, and
the first mobile terminal receives the second image data by carrying out the first wireless communication.

(11)
The image forming system according to any one of (1) to (10), further including
a second mobile terminal that transmits third image data by carrying out second wireless communication, in which
the image forming apparatus receives the third image data by carrying out the second wireless communication and forms an image on the basis of the third image data, and
the second mobile terminal includes
third storage that holds the first communication setting information and is able to hold fourth communication setting information,
a third communicator that carries out the second wireless communication, and
a third setting section that, when the third communicator carries out the second wireless communication, selects the first communication setting information held in the third storage and configures communication setting of the third communicator on the basis of the first communication setting information.

(12)
The image forming system according to (11), in which the image forming apparatus further includes an identifier appending section that assigns a first terminal identifier to the first mobile terminal when the first communicator of the first mobile terminal carries out the first wireless communication, and assigns a second terminal identifier to the second mobile terminal when the third communicator of the second mobile terminal carries out the second wireless communication.

(13)

An image forming system, including:

a first mobile terminal that transmits first image data by carrying out first wireless communication; and an image forming apparatus that receives the first image data by carrying out the first wireless communication and forms an image on the basis of the first image data, the first mobile terminal including an acquiring section that acquires first communication setting information from the image forming apparatus, first storage that is able to hold second communication setting information, a first communicator that carries out the first wireless communication, and a first setting section that, when the first communicator carries out the first wireless communication, selects the first communication setting information acquired by the acquiring section and configures communication setting of the first communicator on the basis of the first communication setting information, the image forming apparatus including second storage that holds the first communication setting information and is able to hold third communication setting information, a supplying section that supplies the first communication setting information held in the second storage to the first mobile terminal, a second communicator that carries out the first wireless communication, a second setting section that, when the second communicator carries out the first wireless communication, selects the first communication setting information held in the second storage and configures communication setting of the second communicator on the basis of the first communication setting information, and an image forming section that forms an image on the basis of the first image data received by the second communicator.

(14)

The image forming system according to (13), in which the image forming apparatus further includes an information generator that generates the first communication setting information, and the second storage holds the first communication setting information generated by the information generator.

(15)

The image forming system according to (13) or (14), in which the supplying section supplies the first communication setting information to the first mobile terminal through near-field communication.

(16)

An image forming apparatus, including:

second storage that holds first communication setting information and is able to hold communication setting information different from the first communication setting information;

a second communicator that receives first image data by carrying out first wireless communication;

a second setting section that, when the second communicator carries out the first wireless communication, selects the first communication setting information held in the second storage and configures communication setting of the second communicator on the basis of the first communication setting information; and an image forming section that forms an image on the basis of the first image data received by the second communicator.

(17)

The image forming apparatus according to (16), further including a supplying section that supplies the first communication setting information held in the second storage to a first mobile terminal.

With the image forming system according to one embodiment of the technology, when the first communicator carries out the first wireless communication, the first communication setting information held in the first storage is selected, and the communication setting of the first communicator is configured on the basis of the first communication setting information. When the second communicator carries out the first wireless communication, the first communication setting information held in the second storage is selected, and the communication setting of the second communicator is configured on the basis of the first communication setting information. Accordingly, it is possible to increase the user-friendliness.

With the image forming system according to one embodiment of the technology, when the first communicator carries out the first wireless communication, the first communication setting information acquired by the acquiring section is selected, and the communication setting of the first communicator is configured on the basis of the first communication setting information. When the second communicator carries out the first wireless communication, the first communication setting information held in the second storage is selected, and the communication setting of the second communicator is configured on the basis of the first communication setting information. Accordingly, it is possible to increase the user-friendliness.

With the image forming apparatus according to one embodiment of the technology, when the second communicator carries out the first wireless communication, the first communication setting information held in the second storage is selected, and the communication setting of the second communicator is configured on the basis of the first communication setting information. Accordingly, it is possible to increase the user-friendliness.

Although the technology has been described in terms of exemplary embodiments, it is not limited thereto. It should be appreciated that variations may be made in the described embodiments by persons skilled in the art without departing from the scope of the invention as defined by the following claims. The limitations in the claims are to be interpreted broadly based on the language employed in the claims and not limited to examples described in this specification or during the prosecution of the application, and the examples are to be construed as non-exclusive. For example, in this disclosure, the term "preferably", "preferred" or the like is non-exclusive and means "preferably", but not limited to. The use of the terms first, second, etc. do not denote any order or importance, but rather the terms first, second, etc. are used to distinguish one element from another. The term "substantially" and its variations are defined as being largely but not necessarily wholly what is specified as understood by one of ordinary skill in the art. The term "about" or "approximately" as used herein can allow for a degree of variability in a value or range. Moreover, no element or component in this disclosure is intended to be dedicated to the public regardless of whether the element or component is explicitly recited in the following claims.

What is claimed is:

1. An image forming system, comprising:

a mobile terminal that transmits image data by carrying out wireless communication; and an image forming apparatus that receives the image data by carrying out the wireless communication and forms an image on a basis of the image data, the image forming apparatus being configured to operate in a first communication mode and a second communication mode that is different from the first communication mode, the mobile terminal including an acquiring section that acquires first communication setting information from the image forming apparatus, for establishing the wireless communication in the first communication mode, a first storage that is configured to hold second communication setting information, a first communicator that carries out the wireless communication, and a first setting section that, when the first communicator carries out the wireless communication, selects the first communication setting information acquired by the acquiring section and configures communication setting of the first communicator on a basis of the first communication setting information, the image forming apparatus including a second storage that holds the first communication setting information, and the third communication setting information for establishing the wireless communication in the second communication mode, a supplying section that supplies the first communication setting information held in the second storage to the mobile terminal, a second communicator that carries out the wireless communication, a second setting section that, responsive to the supplying section supplying the first communication setting information to the mobile terminal and the second communicator carrying out the wireless communication, selects the first communication setting information held in the second storage and configures the communication setting of the second communicator to carry out the communication in the first communication mode on the basis of the first communication setting information, and subsequently configures the communication setting of the second communicator to carry out the communication in the second communication mode on a basis of the third communication setting information after the second communicator has carried out the wireless communication, and an image forming section that forms the image on the basis of the image data received by the second communicator.

2. The image forming system according to claim 1, wherein the image forming apparatus further includes an information generator that generates the first communication setting information, and the second storage holds the first communication setting information generated by the information generator.

3. The image forming system according to claim 2, wherein the information generator generates the first communication setting information each time a predetermined time elapses, and the first communication setting information comprises random information.

4. The image forming system according to claim 2, wherein the information generator generates the first communication setting information each time the supplying section supplies the first communication setting information to the mobile terminal.

5. The image forming system according to claim 1, wherein the supplying section supplies the first communication setting information to the mobile terminal through near-field communication.

6. The image forming system according to claim 1, wherein the second communication mode carries out the wireless communication through an access point, and the first communication mode carries out the wireless communication without the access point.

* * * * *